United States Patent
Rajagopal et al.

(10) Patent No.: US 8,509,688 B2
(45) Date of Patent: Aug. 13, 2013

(54) APPARATUS AND METHOD FOR MAC LOGICAL CHANNEL SELECTION FOR OPERATING PICONETS IN BODY AREA NETWORKS

(75) Inventors: Sridhar Rajagopal, Plano, TX (US); Farooq Khan, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 561 days.

(21) Appl. No.: 12/688,604

(22) Filed: Jan. 15, 2010

(65) Prior Publication Data
US 2010/0273419 A1    Oct. 28, 2010

Related U.S. Application Data

(60) Provisional application No. 61/214,420, filed on Apr. 23, 2009.

(51) Int. Cl.
*H04B 7/00* (2006.01)

(52) U.S. Cl.
USPC ............... 455/41.2; 455/63.1; 455/67.11

(58) Field of Classification Search
USPC ............ 455/41.1, 41.2, 41.3, 67.11, 63.1
See application file for complete search history.

(56) References Cited

U.S. PATENT DOCUMENTS

| | | | | |
|---|---|---|---|---|
| 6,907,226 | B2 * | 6/2005 | Kang et al. ................. | 455/41.2 |
| 7,002,938 | B2 * | 2/2006 | Hester et al. ................ | 370/330 |
| 7,634,232 | B2 * | 12/2009 | Waxman ...................... | 455/63.1 |
| 2003/0134596 | A1 * | 7/2003 | Zhu ............................... | 455/41 |
| 2005/0007963 | A1 * | 1/2005 | Huang et al. ................. | 370/255 |
| 2005/0026569 | A1 * | 2/2005 | Lim et al. ...................... | 455/73 |
| 2006/0002349 | A1 * | 1/2006 | Demirhan .................... | 370/338 |
| 2006/0025487 | A1 | 2/2006 | Scudieri | |
| 2006/0224048 | A1 * | 10/2006 | Devaul et al. ................ | 600/300 |
| 2008/0128402 | A1 | 6/2008 | Shimai | |
| 2009/0016318 | A1 * | 1/2009 | Karaoguz et al. ............ | 370/347 |
| 2009/0147756 | A1 * | 6/2009 | Yang et al. ................... | 370/336 |

(Continued)

FOREIGN PATENT DOCUMENTS

| JP | 2003143644 A | 5/2003 |
|---|---|---|
| JP | 2003309572 A | 10/2003 |

(Continued)

OTHER PUBLICATIONS

International Search Report dated Dec. 8, 2010 in connection with International Patent Application No. PCT/KR2010/002570.

(Continued)

*Primary Examiner* — Lewis West

(57) ABSTRACT

A portable device capable of controlling a piconet selects a logical channel when forming the piconet. The device includes a controller configured to start a first piconet. The controller couples to at least one secondary device in the first piconet. The portable device also includes a transmitter configured to communicate with the at least one secondary device via a wireless communication channel. The controller is configured to select communication channel resources based at least in part on resources allocated to a second piconet in order to mitigate interference between the piconets. The controller is configured to form the first piconet to operate in either a non-interference mode when the controller is able to establish communications with a second controller in the second piconet or a coexistence interference mitigation mode when the controller is unable to establish communications with the second controller in the second piconet.

27 Claims, 15 Drawing Sheets

(56) References Cited

U.S. PATENT DOCUMENTS

2009/0233554 A1* 9/2009 Cordeiro et al. ............ 455/63.1
2010/0255780 A1* 10/2010 Rajagopal et al. .......... 455/41.2
2010/0290451 A1* 11/2010 Karaoguz et al. ............ 370/347

FOREIGN PATENT DOCUMENTS

| | | |
|---|---|---|
| JP | 2005277599 A | 10/2005 |
| KR | 1020050014589 A | 2/2005 |
| KR | 1020050015043 A | 2/2005 |
| KR | 1020060066902 A | 6/2006 |
| RU | 2201034 C2 | 3/2003 |
| RU | 2316125 C2 | 1/2008 |
| WO | WO 2007/124339 A1 | 11/2007 |
| WO | WO 2009/114583 A2 | 9/2009 |

OTHER PUBLICATIONS

Australian Office Action dated Mar. 26, 2013 in corresponding Australian Patent Application No. 2010239888; 3 pages.
Japanese Office Action dated Apr. 9, 2013 in corresponding Japanese Patent Application Publication No. 2003-309572; 5 pages.
Translation of Russian Decision on Grant of Patent dated May 22, 2013 in corresponding Russian Patent Application No. 2011147454/08(071140); 15 pages.

* cited by examiner

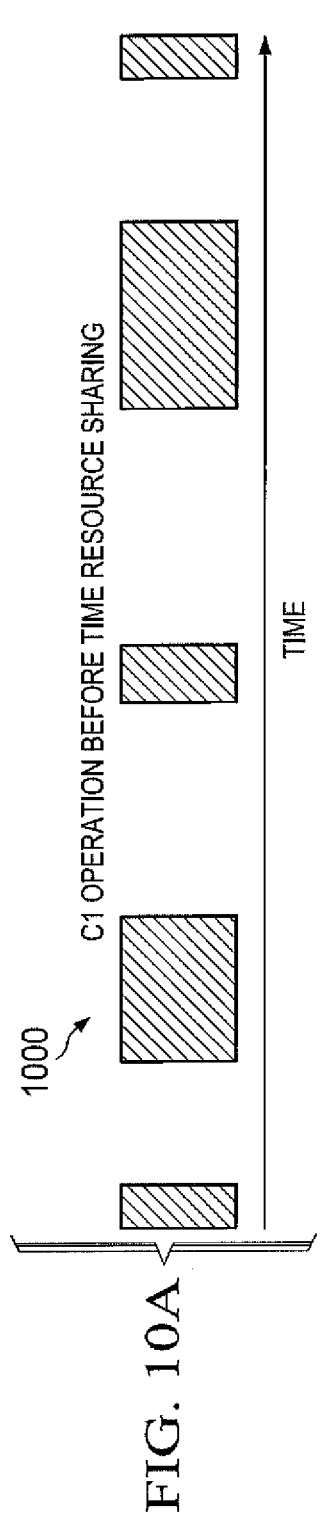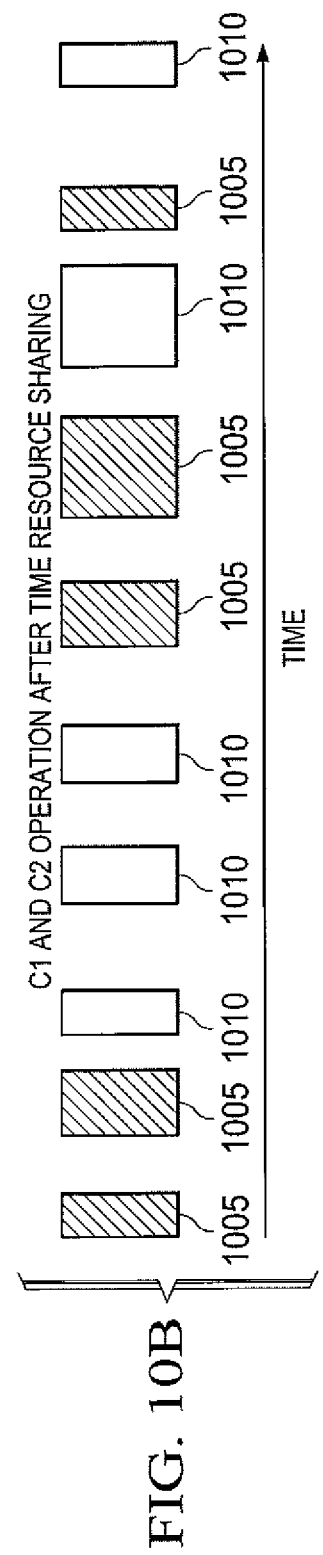

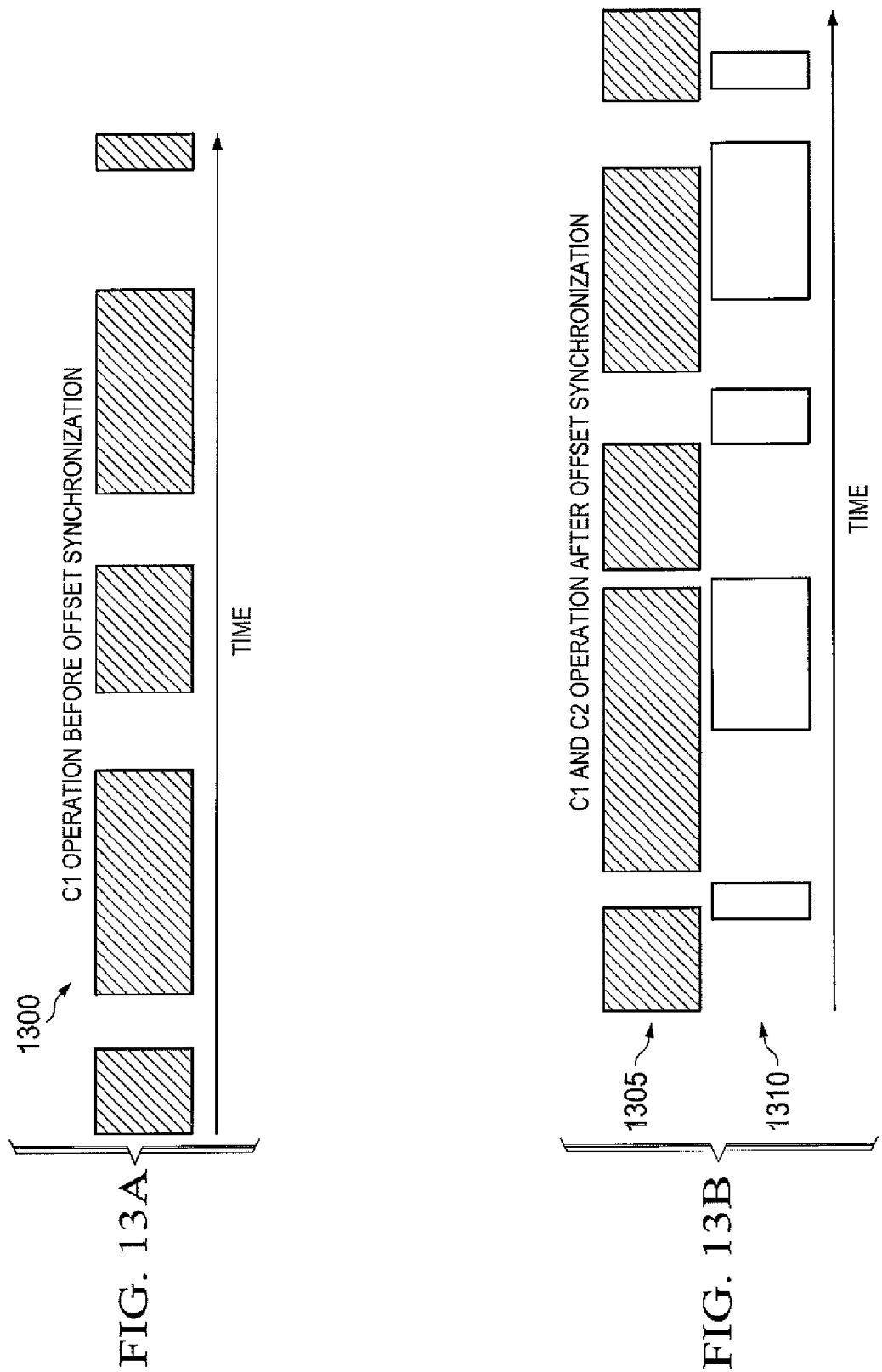

APPARATUS AND METHOD FOR MAC LOGICAL CHANNEL SELECTION FOR OPERATING PICONETS IN BODY AREA NETWORKS

CROSS-REFERENCE TO RELATED APPLICATION(S) AND CLAIM OF PRIORITY

The present application is related to U.S. Provisional Patent Application No. 61/214,420, filed Apr. 23, 2009, entitled "MAC LOGICAL CHANNEL SELECTION FOR SIMULTANEOUSLY OPERATING PICONETS FOR BODY AREA NETWORKS". Provisional Patent Application No. 61/214,420 is assigned to the assignee of the present application and is hereby incorporated by reference into the present application as if fully set forth herein. The present application hereby claims priority under 35 U.S.C. §119(e) to U.S. Provisional Patent Application No. 61/214,420.

TECHNICAL FIELD OF THE INVENTION

The present application relates generally to body area networks and, more specifically, to an apparatus, system and method for operating piconets for UWB-based Body Area Networks.

BACKGROUND OF THE INVENTION

A Body Area Network (BAN) is a short-range communication network including multiple devices on or near a body. The short-range communication network can include one or more devices located up to three meters (3 m) apart. The devices can be located on a human body. The devices serve a variety of applications such as, for example, medical, personal fitness devices, consumer electronics and personal entertainment.

SUMMARY OF THE INVENTION

A device for use in a body area network capable of low power communications is provided. The device includes a controller configured to start a first piconet. The controller further is configured to couple to at least one secondary device. The device and at least one secondary device are coupled in the first piconet. The device also includes a transmitter configured to communicate with the at least one secondary device via a wireless communication channel. The controller is configured to select communication channel resources based at least in part on resources allocated to a second piconet. The controller is configured to form the first piconet to operate in either a non-interference mode when the controller is able to establish communications with a second controller in the second piconet or a coexistence interference mitigation mode when the controller is unable to establish communications with the second controller in the second piconet.

A method for operating a piconet in a body area network capable of low power wireless communications is provided. The method includes selecting, by a first piconet controller, a first frequency band as an operation frequency band for operation of a first piconet. The method also includes scanning at least one channel in the operation frequency band to determine if a second piconet is operating within the at least one channel. The first piconet is formed based at least in part on a result of the scanning and either in a random mode if the second piconet is not determined to be operating within the at least one channel or in an interference mode an interference mode if the second piconet is determined to be operating within the at least one channel.

A system that includes a plurality of devices capable of low power wireless communications is provided. In the system a first piconet controller is configured to control communications in an existing piconet. The system includes a second piconet controller configured to establish a new piconet and control communications in the new piconet. The second piconet controller includes a processor configured to form the new piconet and select a logical channel for operation of the new piconet. The second piconet controller also includes a receiver interface configured to detect a presence of the existing piconet. The processor further is configured to select the logical channel and an operational mode based at least in part on an attribute of the existing piconet. The processor also is configured to form the new piconet to operate in either: a non-interference mode when the processor is able to establish communications with the first piconet controller; and a coexistence interference mitigation mode when the processor is unable to establish communications with the first piconet controller Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A through 10B illustrate piconet time resource sharing according to embodiments of the present disclosure;

FIGS. 13A through 13B illustrate piconet offset synchronization according to embodiments of the present disclosure;

DETAILED DESCRIPTION OF THE INVENTION

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

Figure 1:
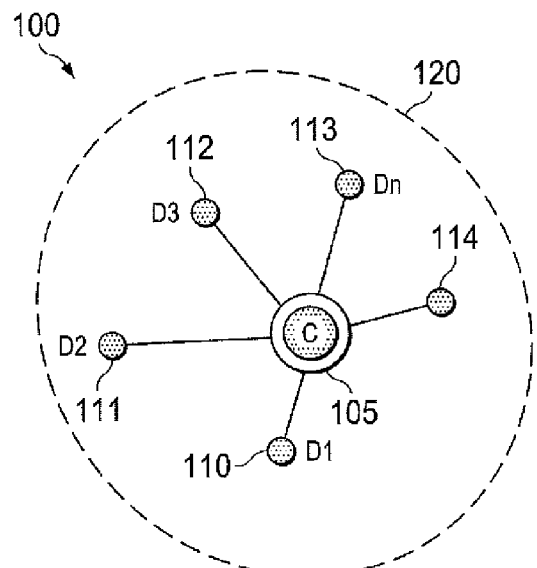
FIG. 1 illustrates an example body area network according to this disclosure.

FIG. 1 illustrates an example body area network according to this disclosure. The embodiment of the BAN 100 shown in FIG. 1 is for illustration only. Other embodiments could be used without departing from the scope of this disclosure.

The BAN 100 includes a central device 105 and a number of secondary devices 110-114. The secondary devices 110-114 are each configured to couple, or "pair," with the central device 105. When one or more secondary devices 110-114 pair with the central device 105, the central device 105 and paired secondary devices 110-114 form a piconet 120. The devices 105 and 110-114 in the piconet 120 can communicate with each other via a wireless communication. It will be understood that illustration of five (5) secondary devices in a piconet is for example purposes only and the piconet 120 can include any number of secondary devices without departing from the scope of this disclosure.

The central device 105 can be configured to pair with one or more compatible secondary devices 110-114 within a coverage area of piconet 120, also referred to as a cell. A dotted line shows the approximate extents of coverage areas of the piconet 120, which are shown as approximately elliptical for the purposes of illustration and explanation only. It should be clearly understood that the coverage area associated with the central device 105, for example, coverage area of the piconet 120, may have other shapes, including irregular shapes, depending upon the configuration of the central device 105 and variations in the radio environment associated with natural and man-made obstructions. The coverage area of the piconet 120 can vary in size based on the transmit power and the receive power of the central device 105. For example, the central device 105 can be configured to pair with a number of secondary devices 110-114 located within a range from less than one (<1) meter to five (5) meters. It will be understood that illustration of the range from less than one (<1) meter to five (5) meters is for example purposes only and other ranges could be used without departing from the scope of this disclosure.

When paired, the central device 105 can send data to each of the secondary devices 110-114. The central device 105 can send the data individually, collectively, or to select groups of the secondary devices 110-114. For example, central device 105 can send data to secondary device D1 110 individually. Additionally, central device 105 can send messages (such as, but not limited to beacons) to all secondary devices D1 110-114 substantially simultaneously to establish frame structure, provide contention access period and perform resource allocation.

Furthermore, when paired, the central device 105 can receive data from each of the secondary devices 110-114. The central device 105 can receive the data individually or from one or more of the secondary devices 110-114 at substantially the same time. For example, central device 105 can receive data from secondary device D1 110 individually.

Figure 2A:
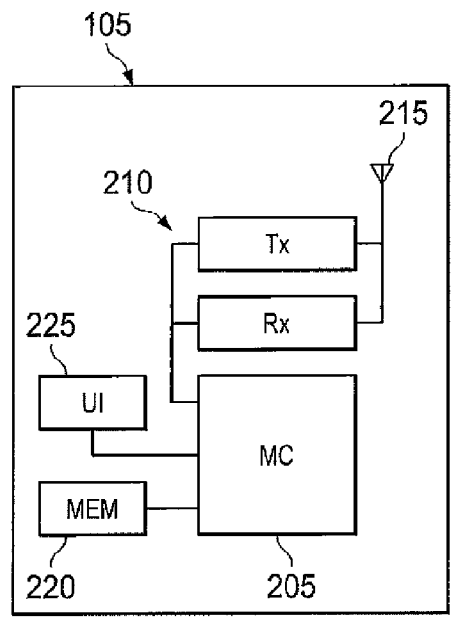
FIG. 2A illustrates a central device according to embodiments of the present disclosure.

FIG. 2A illustrates a central device according to embodiments of the present disclosure. The central device 105 shown in FIG. 2A is for illustration only. Other embodiments could be used without departing from the scope of this disclosure.

The central device 105 can be any type of electronic device capable of controlling one or more secondary devices 110-114 when paired with the secondary device 110-114. For example and not limitation, the central device 105 can be a cellular phone, Personal Data Assistant (PDA), a smart phone, portable computer, media player (such as an MP3 player or the like), a headset, or a media device (such as a video recorder or the like).

The central device 105 can include a microcontroller 205. The microcontroller 205 can be a processor or processor array configured to control the operations of the central device 105. In some embodiments, the microcontroller 205 is configured to pair central device 105 with one or more secondary devices 110-114.

The central device 105 also can include a transceiver 210 coupled to the microcontroller 205. In some embodiments, the transceiver 210 can be a main transmission/reception device for central device 105 and couples to the microcontroller 205 via an interface (not illustrated) that is adapted to enable the microcontroller 205 to use the transceiver 210. The transceiver 210 includes a transmit path (Tx) configured to transmit data signals and messages to the secondary devices 110-114 via one or more antenna 215. The transceiver 210 also includes a receive path (Rx) configured to receive data signals and messages from the secondary devices 110-114 via the antenna 215. In some embodiments, not specifically illustrated, the central device 105 includes a transmitter and a receiver as separate components.

The central device 105 also includes a memory 220. According to some embodiments, microcontroller 205 is operable to store information in the memory 220. Memory 220 can be any computer readable medium, for example, the memory 220 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 220 comprises a random access memory (RAM) and another part of memory 220 comprises a Flash memory, which acts as a read-only memory (ROM). In some such embodiments, the microcontroller 205 is configured to execute a plurality of instructions stored in a memory (not illustrated) configured to cause the microcontroller 205 to perform a number of operations of the central device 105.

In some embodiments, the central device 105 includes a User Interface (UI) 225. The UI 225 is coupled to the microcontroller 205. The UI 225 is configured to receive one or more inputs from a user in order to direct a function of the central device 105. For example and not limitation, the UI 225 can be configured to place the central device 105 in a pair mode such that the central device 105 commences a search operation for secondary devices 110-114 and pairs with one or more of the secondary devices 110-114 located within the coverage area 120. In some embodiments, the UI 225 can be an Input/Output (I/O) port adapted to couple to an external device, such as, for example, a personal computer, such that the user can use the external device to direct operations or store data, such as, for example, media data, in the central device 105.

Figure 2B:
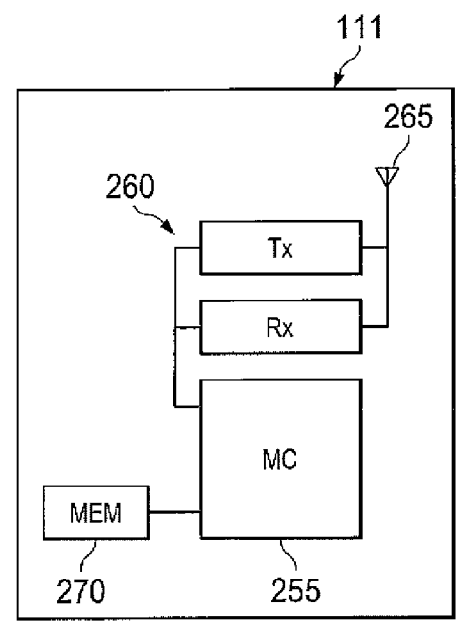
FIG. 2B illustrates a secondary device according to embodiments of the present disclosure.

FIG. 2B illustrates a secondary device according to embodiments of the present disclosure. The secondary device 111 shown in FIG. 2B is for illustration only. Other embodiments could be used without departing from the scope of this disclosure. Further, secondary devices 111-114 can include similar components and functionality as described with respect to secondary device 111.

The secondary device 111 can be any type of electronic device capable of pairing with the central device 105. For example and not limitation, the secondary device 105 can be a health monitor device, a sensor, an access point, a remote control, a personal storage device, a video display device, a remote beam-finder, a global positioning system device, a cellular phone, Personal Data Assistant (PDA), a smart phone, portable computer, media player (such as an MP3 player or the like), a headset, an automobile, or a media device (such as a video recorder or the like).

The secondary device 111 can include a microcontroller 255. In some embodiments, the microcontroller 255 can be a processor or processor array configured to control the operations of the secondary device 111. In some embodiments, the microcontroller 255 is configured to pair secondary device 111 with the central device 105.

The secondary device 111 also can include a transceiver 260 coupled to the microcontroller 255. In some embodiments, the transceiver 260 can be a main transmission/reception device for secondary device 111 and couples to the microcontroller 255 via an interface (not illustrated) that is adapted to enable the microcontroller 255 to use the transceiver 260. The transceiver 210 includes a transmit path (Tx) configured to transmit data signals and messages to the central device 105 via one or more antenna 265. The transceiver 260 also includes a receive path (Rx) configured to receive data signals and messages from the central device 105 via the antenna 265. In some embodiments, not specifically illustrated, the secondary device 111 includes a transmitter and a receiver as separate components.

The secondary device 111 also includes a memory 270. According to some embodiments, microcontroller 255 is operable to store information in the memory 270. Memory 270 can be any computer readable medium, for example, the memory 270 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 270 comprises a random access memory (RAM) and another part of memory 270 comprises a Flash memory, which acts as a read-only memory (ROM). In some such embodiments, the microcontroller 255 is configured to execute a plurality of instructions stored in a memory (not illustrated) configured to cause the microcontroller 255 to perform a number of operations of the secondary device 111.

In some embodiments, the microcontroller 255 is preconfigured to cause the secondary device 111 to pair with a central device 105. The secondary device 111 can pair with the central device 105 in response to a pairing signal received from the central device 105. In some embodiments, the secondary device 111 is configured to actively search and pair with the central device 105.

In some embodiments, the secondary device 111 includes a user interface (not illustrated). The user interface can be coupled to the microcontroller 255. The user interface is configured to receive one or more inputs from a user in order to direct a function of the secondary device 111. For example and not limitation, the user interface can be configured to place the secondary device 111 in a pair mode such that the secondary device 111 commences a search operation for central device 105. In some embodiments, the user interface can be an Input/Output (I/O) port adapted to couple to an external device, such as a personal computer, such that the user can use the external device to direct operations or store data, such as media data, in the secondary device 111.

The microcontroller 255 can be configured to be responsive to commands received from the central device 105. For example, the secondary device 111 can receive commands via antenna 265 and transceiver 260. The microcontroller 255 can interpret the commands and alter one or more functions of the secondary device 111 in response to the commands. As an additional example, the microcontroller 255 can direct a playback of a media file stored in memory 270 through a speaker (not illustrated) in the secondary device 111. As a further example, the microcontroller 255 can direct the transmission of data, such as stored in memory 270 or sensed via sensor (not illustrated), to the central device 105.

Additionally, in some embodiments, the microcontroller 255 can be configured to limit the pairing of the secondary device 111 such that the secondary device 111 only pairs with one central device 105 at a time. In some embodiments, the secondary device 111 can pair with one central 105b but detect presence of a second central device 105a (described in more detail with respect to FIG. 18).

Figure 3:
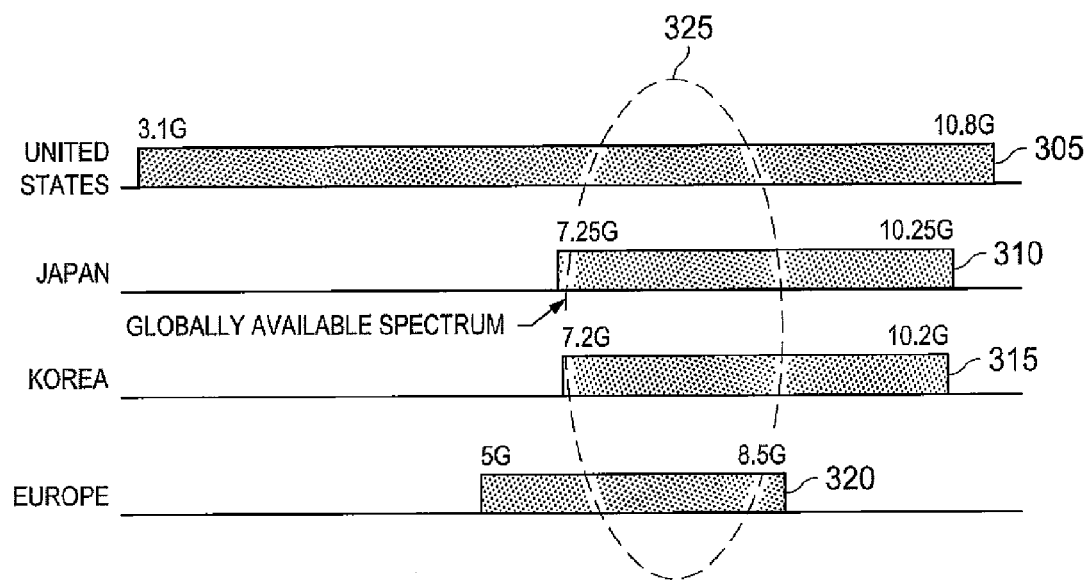
FIG. 3 illustrates an Ultra Wide Band world-wide spectrum according to an exemplary embodiment of the disclosure.

FIG. 3 illustrates an Ultra Wide Band world-wide spectrum according to an exemplary embodiment of the disclosure. The embodiment of the Ultra Wide Band (UWB) world-wide spectrum shown in FIG. 3 is for illustration only. Other embodiments could be used without departing from the scope of this disclosure.

IEEE 802.15.6, the contents of which are incorporated by reference in their entirety, is developing a standard for BAN and has proposed a coexistence requirement of at least 10 piconets to co-exist. UWB is very interesting for BAN due to the unlicensed band, low transmit power, and ability to work under interference due to large bandwidth. UWB, however, is unable to support more than two bands globally due to the 500 MHz requirement. Accordingly, when using UWB, at least ten piconets need to operate within two frequency bands, which implies that at least five piconets may need to operate in the same band at the same time.

The BAN is configured for a broad range of possible devices, both central devices 105 and secondary devices 110-114. The BAN can be configured to utilize a low power environment for operation on, in and around the human body. It will be understood that BAN operation is not limited to operation on, in and around the human body, but can be applicable to other bodies, such as, for example, animals, and man-made objects. The BAN also is configured for a broad range of media types and a variety of applications including medical, consumer electronics and personal entertainment. In some embodiments, therefore, the central device 105 and secondary devices 110-114 can be configured to use UWB.

In some embodiments, at least ten (10) piconets can operate within a 6×6×6 cubic meter ($m^3$) area. For example, in some embodiments, at least sixteen (16) piconets can operate within a 6×6×6 $m^3$ area. Additionally, the piconets can be configured to operate globally.

The UWB spectrum, however, is restricted for use in some countries. For example, the United States UWB spectrum 305 comprises a range from 3.1 GHz to 10.6 GHz. The Japanese UWB spectrum 310 comprises a range from 7.25 GHz to 10.25 GHz. The Korean UWB spectrum 315 comprises a range from 7.2 GHz to 10.2 GHz. The European UWB spectrum 320 comprises a range from 6 GHz to 8.5 GHz. Accordingly, a common globally available UWB spectrum 325 is approximately 1.25 GHz wide (e.g., a maximum of 8.5 GHz in the European UWB spectrum 320—the minimum of 7.25 GHz in the Japanese UWB spectrum 310).

In some embodiments, each piconet operates within a bandwidth of five hundred Megahertz (500 MHz). Therefore, the ten or more piconets are configured to operate within two (2) frequency bands of 500 MHz each. As such, the piconets may have overlapping resources in time and frequency and may cause interference in operation. Since each piconet can operate independently of other piconets within an area, coordination of time or frequency resources between piconets can be challenging.

Figure 4:
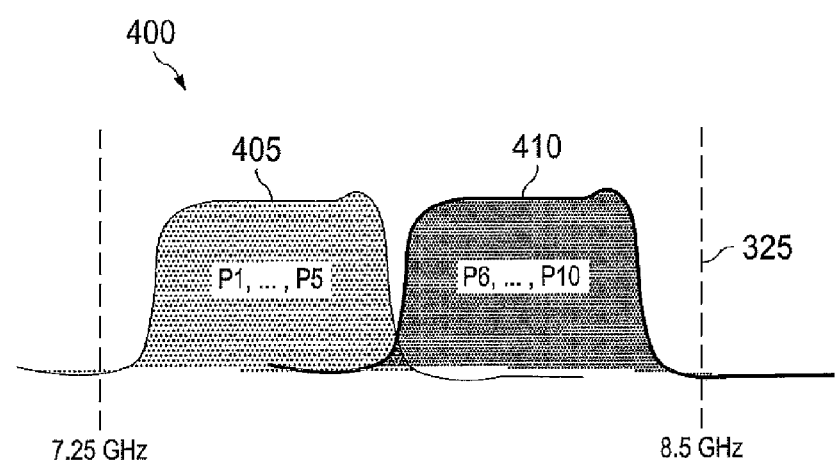
FIG. 4 illustrates a piconet distribution for a bandwidth according to embodiments of the present disclosure.

FIG. 4 illustrates a piconet distribution for a bandwidth according to embodiments of the present disclosure. The embodiment of the piconet distribution 400 shown in FIG. 4 is for illustration only. Other embodiments of the piconet distribution 400 could be used without departing from the scope of this disclosure.

In some embodiments, five (5) piconets can operate within the same operating band at the same time. For example, P1 through P5 can operate at the same time in a first bandwidth 405 while P6 through P10 can operate at the same time in a second bandwidth 410. Therefore, receivers in the secondary devices 110-114 for each respective piconet (P1-P5 for the first bandwidth 405 and P6-P10 for the second bandwidth 410) can receive transmissions from other piconets at the same time. Therefore, the piconets can be configured to operate at the same time and within the respective bandwidth 405, 410 by using interference avoidance techniques that can include any one or more of a duty cycle, a modified preamble design, and an error recovery mechanism in order to reduce interference resulting from the signals from other piconets operating at the same time within the same frequency bandwidth.

Figure 5:
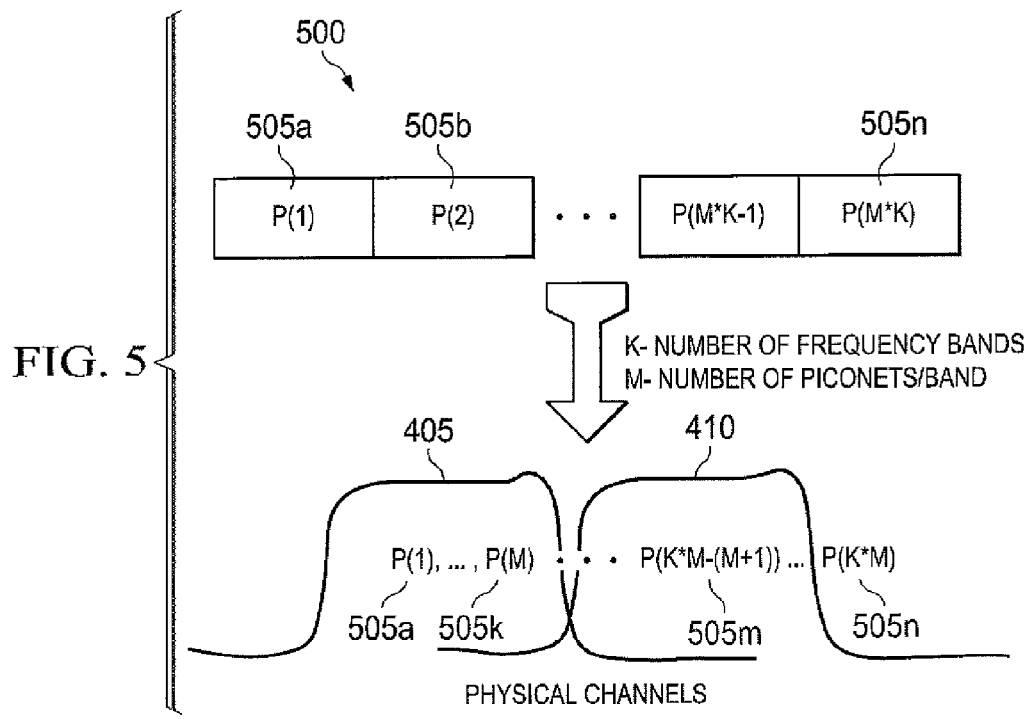
FIG. 5 illustrates a logical to physical mapping for a bandwidth according to embodiments of the present disclosure.

FIG. 5 illustrates a logical to physical mapping for a bandwidth according to embodiments of the present disclosure. The embodiment of the mapping 500 shown in FIG. 5 is for illustration only. Other embodiments could be used without departing from the scope of this disclosure.

In order to establish communications between the secondary device 111 and the central device 105, a Media Access Control (MAC) in the controller 205 can assign logical channels P 505a-505n for communication. A number of the logical channels P 505a-505n that the MAC can assign can be based on a "K" number of frequency bands that each support up to "M" number of logical channels P 505a-505n. Therefore, a total number of logical channels P 505a-505n can be equal to K×M. For example, a first number of logical channels P(1) 505a-P(M) 505k can be assigned within the first bandwidth 405 and a second number of logical channels P(K×(M−(M+1))) 505m–P(K×M) 505n can be assigned within the second bandwidth 410. The controller 205 maps the logical channel P 505a-505n to the physical channel in a number of ways, such as using a time division multiplexing, frequency division multiplexing, or a hybrid approach. In some embodiments, the logical channels P 505 are orthogonal such that the logical channels 505a-505n selected by the MAC do not affect the performance of adjacent piconets using other logical channels P 505a-505n. However, depending upon physical layer design and spectrum constraints, some interference, such as adjacent channel interference and overlapping channel interference, can exist.

Figure 6:
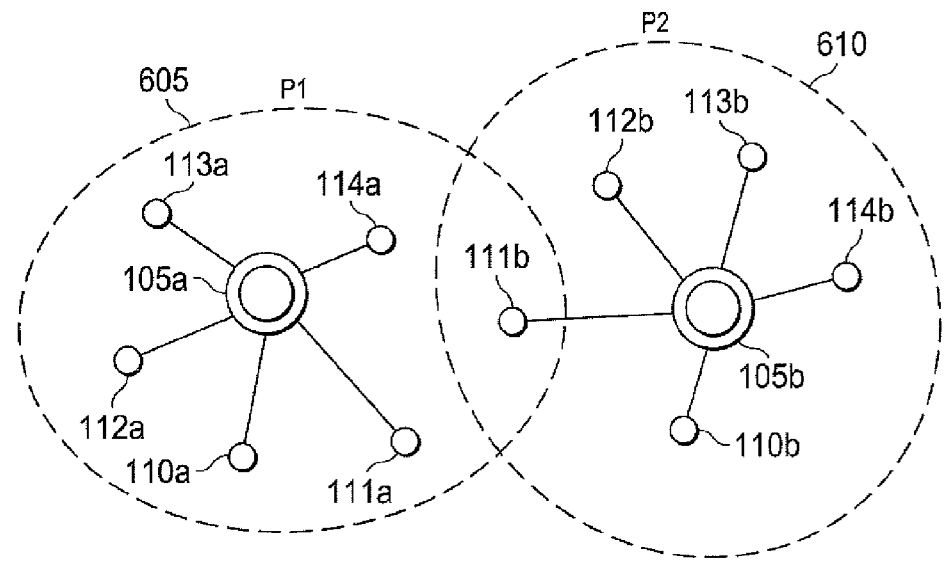
FIG. 6 illustrates two piconets operating in close proximity according to embodiments of the present disclosure.

FIG. 6 illustrates two piconets operating in close proximity according to embodiments of the present disclosure. The piconets shown in FIG. 6 are for illustration only. Other embodiments could be used without departing from the scope of this disclosure.

In the example illustrated in FIG. 6, piconets P1 605 and P2 610 are operating in close proximity to each other. For example, P1 605 and P2 610 can be located within a 6×6×6 $m^3$ area. P1 605 includes a central device 105a and a number of secondary devices 110a-114a. P2 610 includes the second central device 105b and a number of secondary devices 110b-114b.

Secondary device 111b is paired with the second central device 105b. As such, secondary device is located in and communicates in P2 610. Secondary device 111b can be, for example, an MP3 player and the second central device 105b can be, for example, a smart phone. Secondary device 111b is located such that secondary device 111b also is within a coverage area of P1 605. Therefore, secondary device 111b can receive (e.g., "hear") signals from central device 105a. When P1 605 and P2 610 share the same frequency band and same time, the signals that secondary device 111b receives from central device 105a can be interference signals. That is, secondary device 111b can experience inter-piconet interference.

Interference has been an issue for standards that use the un-licensed spectrum. In order to minimize interference, networks, such as a Bluetooth® network, use pseudo-random frequency-hopping over seventy-nine (79) channels. However, UWB networks may support very few physical channels that meet the 500 MHz bandwidth requirement. Therefore, embodiments of the present disclosure provide for interference management from the MAC.

In some embodiments, the MAC in a central device 105 is configured to enable multiple piconets 605, 610 to operate in close proximity in the same frequency band 405, 410. The central device 105 can operate in a non-interference (NI) mode, a coexistence interference mitigation (CM) mode, or a combination of the two.

In some embodiments, the central device 105 operates in a NI mode. In the NI mode, the controllers 205 in a number of central devices co-ordinate and share the time resources either by a first option including negotiations for the time resource or by a second option using an offset piconet synchronization method. For example, the controller 205 in the first central device 105a and the controller 205 in the second central device 105b perform the first option by negotiating for the time resources in order to avoid interference.

In some embodiments, the central device 105 operates in a CM mode. In the CM mode, the controllers 205 in a number of central devices may be unable or unwilling to communicate with each other or may not have the available resources to accommodate a request by another piconet. For example, the controller 205 in the first central device 105a may be running a high priority application and be unwilling to negotiate with the controller 205 in the second central device 105b. Therefore, the controller 205 in the second central device 105b selects a logic channel P 505 for the second piconet P2 610 in order to minimize the probably of collisions with communications in the first piconet P1 605.

The various operations for the modes of coexistence that can be used by the controller 205 are illustrated in Table 1.

TABLE 1

Modes of coexistence operation

| Non-interference (NI) Mode | Coexistence interference Mitigation (CM) mode. |
|---|---|
| Piconets can talk with each other | Controllers in adjacent piconets are unable or unwilling to talk to each other |
| Option 1: Resources can be shared by negotiation | Piconet may not have resources to accommodate other piconets |
| Option 2: Offset synchronization mechanism possible | Best effort logical channel selection performed to minimize probability of collision. |

Figure 7:
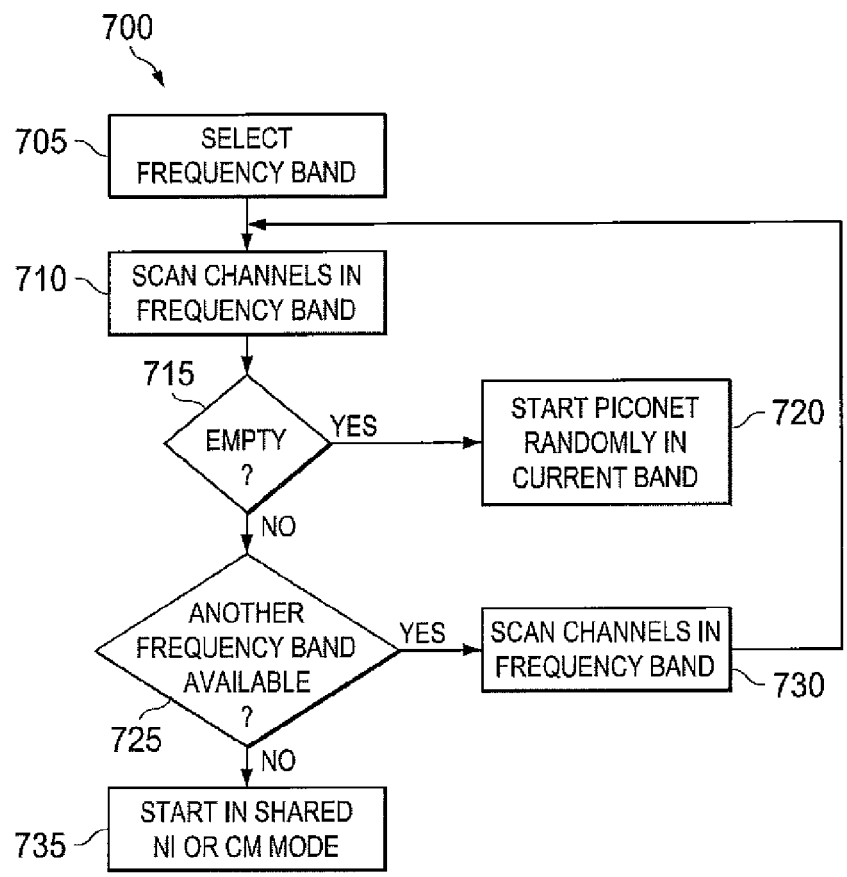
FIG. 7 illustrates a method for forming a piconet according to embodiments of the present disclosure.

FIG. 7 illustrates a method for forming a piconet according to embodiments of the present disclosure. The embodiment of the process 700 shown in FIG. 7 is for illustration only. Other embodiments could be used without departing from the scope of this disclosure.

Prior to forming the piconet P2 610, the controller 205 in the second central device 105b performs a listen-before-talk process 700 in order to determine and investigate the presence of another piconet. Using the listen-before talk process 700, the MAC in the second central device 105b can assign new logical channels P 505a-505n for the second piconet P2 610 while minimizing the impact on an existing piconet, such as piconet P1 605.

In block 705, the second central device 105b selects a frequency band to be used as the operational frequency band for the second piconet 610. The second central device 105b can select the frequency band using any suitable criteria for band selection, such as selecting a default frequency band or the lowest frequency band available for minimum path loss.

In block 710, the second central device 105b scans for piconet numbers assigned to the selected frequency band. The second central device 105b can sequentially scan for "M" piconets assigned to the selected. For example, if "K" frequencies and "M" logical channels P 505 exist per band, the second central device 105b sequentially scans all "M" piconets assigned to the selected frequency band.

In block 715, the second central device 105b determines if any piconets were found in the selected band. If no piconets are found operating in the selected band, the second central device 105b starts a new piconet in block 720. The new piconet can be started by selecting a logical channel randomly in the selected band.

Alternatively, if the second central device identifies that another piconet is operating in the selected band, the second central device 105b determines if another frequency band is available in block 725. Therefore, when the second central device 105b finds one or more piconets operating in the selected band, the second central device 105b selects another frequency band in block 730. For example, the second central device 105b can select a next available frequency band in block 730 and return to block 710 to scan the channels in the newly selected frequency band to determine if a piconet is operating in the selected frequency band.

However, if in block 725, the second central device 105b determines that all the available frequency bands have been scanned; the second central device 105b determines that a new logical channel cannot be started randomly without risking inter-piconet interference. Therefore, in block 735, the second central device 105b selects one of the NI mode or CM mode in order to start the new piconet.

Figure 8:
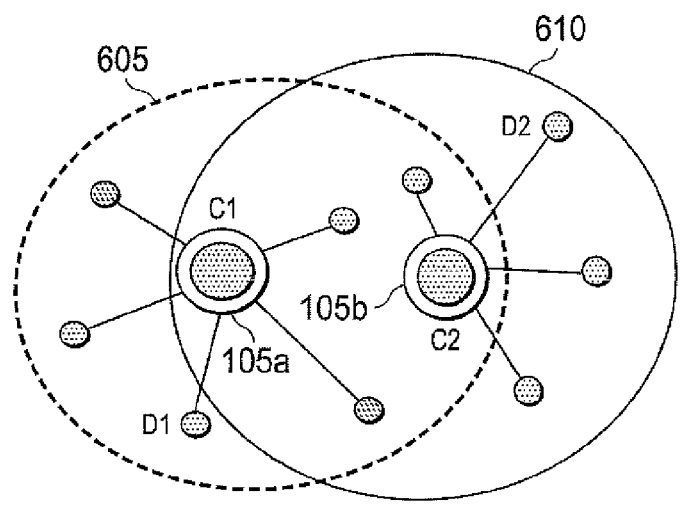
FIG. 8 illustrates two piconets operating in close proximity using the non-interference mode according to embodiments of the present disclosure.

FIG. 8 illustrates two piconets operating in close proximity using the non-interference mode according to embodiments of the present disclosure. The embodiment of the piconets shown in FIG. 8 is for illustration only. Other embodiments could be used without departing from the scope of this disclosure.

The first central device 105a and the second central device 105b are in close proximity to each other, such as, within a 6×6×6 $m^3$ area. The second central device 105b determines that a piconet operated is operated by the first central device 105a. For example, the second central device 105b can perform the listen-before-talk process 700. The second central device 105b determines that there is an existing piconet (that is, the first piconet 605) operated by the first central device 105a. Upon finding the first central device 105a, the second central device 105b joins the first piconet 605 as a device and communicates with the first central device 105a. The second central device 105b can request that the first piconet 605 operated by the first central device 105a and the second piconet 610 to be operated by the second central device 105b share resources. The second central device 105b can communicate its bandwidth requirement to the first central device 105a. The second central device 105b also can communicate priority information to allow for priority to be used between the piconets 605, 610. For example, medical devices can require a higher priority than entertainment devices for body area networks. In some embodiments, existing piconets, such as piconet 605, can be mandated to provide time resource sharing to higher priority devices. Additionally, medical devices may have a lower activity than other applications, such as entertainment applications. Therefore, piconets running medical applications can be more readily adaptable to sharing resources.

In response to the request from the second central device 105b, the first central device 105a can adjust its timing. The first central device 105a communicates its new timing schedule to the second central device 105b. Thereafter, the first central device 105a utilizes the remaining resources for its applications. In some embodiments, the first central device 105a also informs the second central device 105b regarding the presence of additional existing piconets. For example, the first central device 105a can inform the second central device 105b regarding existing piconets that the second central device 105b is unable to detect. Additionally, the second central device 105b can help the first central device 105a detect additional piconets that have been detected by the second central device 105b but may not be detected by the first central device 105a. Accordingly, the first central device 105a and the second central device 105b can work together to synchronize across multiple piconets. In some embodiments, the request to share resources and information sharing is performed using information elements (Is) in the MAC protocol.

Figure 9:
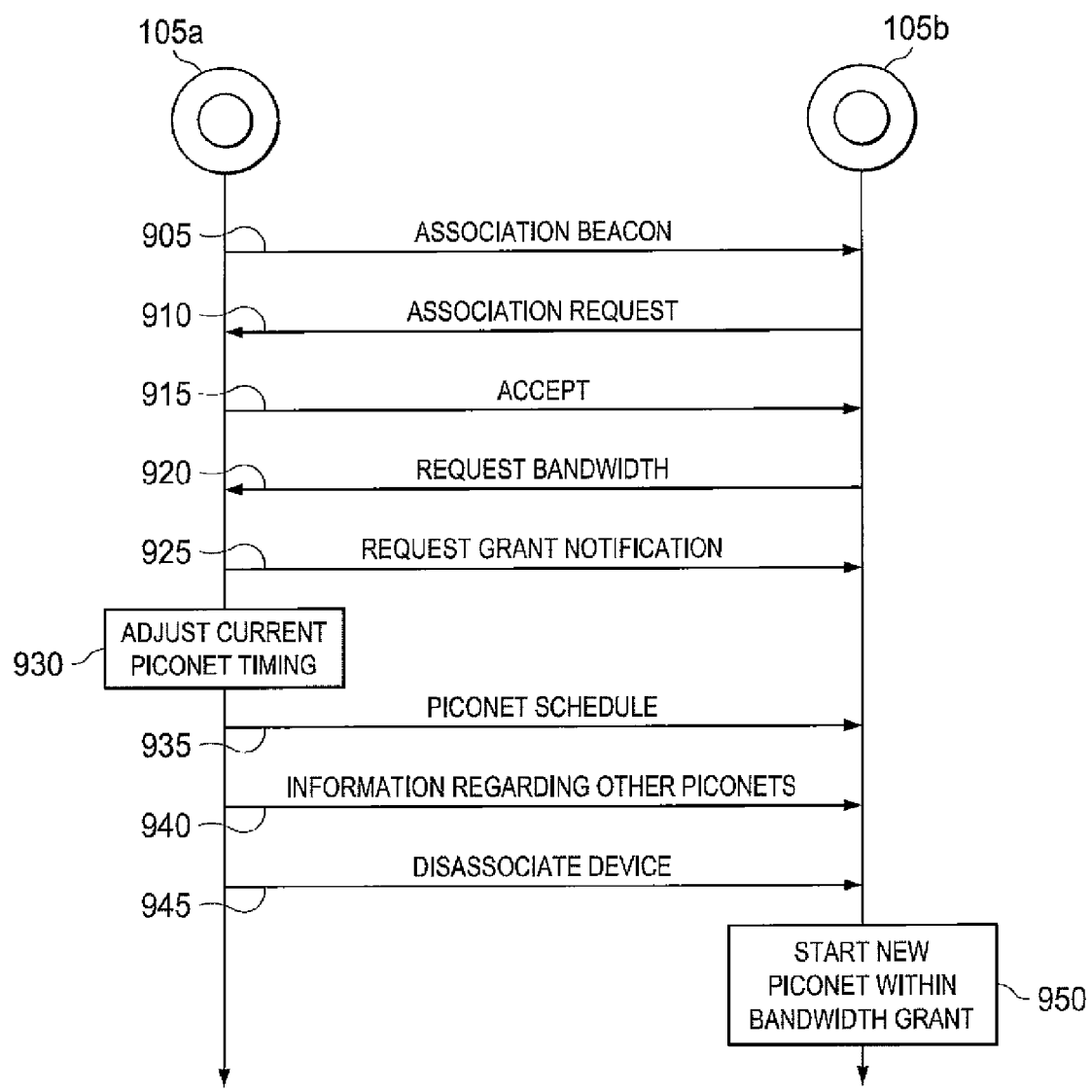
FIG. 9 illustrates a sequence of operations for non-interference mode time resource sharing according to embodiments of the present disclosure.

FIG. 9 illustrates a sequence of operations for non-interference mode time resource sharing according to embodiments of the present disclosure. The embodiment of the sequence of operations shown in FIG. 9 is for illustration only. Other embodiments could be used without departing from the scope of this disclosure.

The first central device 105a transmits an Association Beacon 905 that can be detected by the second central device 105b. For example, the second central device 105b can perform the listen-before-talk process 700 to determine if any other piconets that are in close proximity are operating on the same frequency band and at the same time.

When the second central device 105b detects the Association Beacon 905, the second central device 105b transmits an Association Request 910 to join the piconet 605 as a device. In response, the first central device 105a can transmit an Accept Message 915 granting the Association Request 910.

Thereafter, the second central device 105b can transmit a Request for Bandwidth 920 to start the second piconet 610. The Request for Bandwidth 920 can include priority information corresponding to the type of service to be provided on the second piconet 610. For example, the second central device 105b can include priority information indicating that the devices in the second piconet 610 will be performing medical applications.

In response to the Request for Bandwidth 920, the first central device 105a can transmit a Request Grant Notification 925 to the second central device 105b. For example, if the first piconet 605 is performing a lower priority application or if the first piconet 605 has an activity level such that it can share a portion of its resources, the first central device 105a sends the Request Grant Notification 925 to inform the second central device 105b that its resources can be shared.

Additionally, the central device 105 with the lower priority adjusts the resources 930, such as the timing of the piconet, around a higher priority schedule. For example, the first central device 105a can adjust the current timing 930 for the first piconet 605. If the first central device 105a has a lower or equal priority as the second central device 105b, the first central device 105a adjusts the timing 930 of the first piconet 605 and sends a piconet schedule 935 to the second central device 105b. Thereafter, the first central device 105a can utilize the remaining resources for the applications in the first piconet 605.

The first central device 105a also can send Information Regarding Other Piconets 940 to the second central device 105b. The Information Regarding Other Piconets 940 can include information regarding piconets that the second central device 105b is unable to see or otherwise unable to communicate. Piconet synchronization is done sequentially. When the second piconet 610 is being formed, the knowledge of other piconets is sent from the first central device 105a to help with logical channel selection. This information assists the second central device 105b to synchronize among multiple (>2) piconets, when such possibility exists.

The first central device 105a then dissociates 945 the second central device 105b from the first piconet 605. In some embodiments, the second central device 105b initiates the disassociation. The central devices 105 are dissociated from each other in order to reduce overhead between the piconets 605, 610. Thereafter, the second central device 105b starts 950 the second piconet 610 within the bandwidth grant.

FIGS. 10A through 10B illustrate piconet time resource sharing according to embodiments of the present disclosure. The embodiments of the piconet timing shown in FIGS. 10A and 10B are for illustration only. Other embodiments could be used without departing from the scope of this disclosure.

FIG. 10A shows the piconet timing for the first piconet 605 prior to adjustment. FIG. 10B shows the piconet timing for the first piconet 605 and the second piconet 610 after adjustment.

Prior to adjusting the piconet timing, the first central device 105a operates the first piconet 605 according a first timing schedule 1000. If the first central device 105a has a lower priority than the second central device 105b, the first central device 105a adjusts the timing schedule of the first piconet 605 to a new timing schedule 1005. The first central device 105a sends the new piconet schedule 1005 to the second central device 105b. The second central device 105b receives the new piconet schedule 1005 and determines that the second piconet 610 can be started in the available time slots. Accordingly, the second central device 105b starts, and operates, the second piconet 610 according to the second piconet timing schedule 1010.

Figure 11:
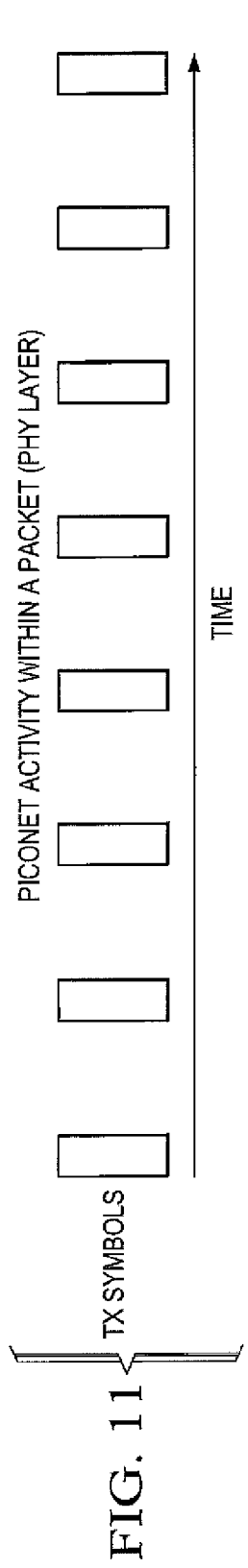
FIG. 11 illustrates piconet activity with a low duty cycle according to embodiments of the present disclosure.

In some embodiments, the first piconet 605 and second piconet 610 share resources via an NI mode offset piconet synchronization. When the first piconet 605 and the second piconet 610 have a similar priority, the first central device 105a can allow priority to the second central device 105b, as discussed herein above with respect to FIGS. 9 and 10A-10B, or the first central device 105a can adjust its duty cycle to co-exist with the second central device 105b. When the first central device 105a adjusts its duty cycle, the second central device 105b starts the second piconet 610 at an offset from the first piconet 605. For example, the first central device 105a and second central device 105b each can use a physical layer with a low duty cycle option using modulation such as on-off keying for low power consumption. An example of this is illustrated in FIG. 11. Coexistence can be maintained as long as the duty cycle is less than or equal to fifty percent ($\leq 50\%$). Accordingly, the first central device 105a and the second central device 105b can use an offset option when time resource sharing mode is not possible due to limited resources on the first piconet 605 or equal priorities between the first piconet 605 and second piconet 610.

Figure 12:
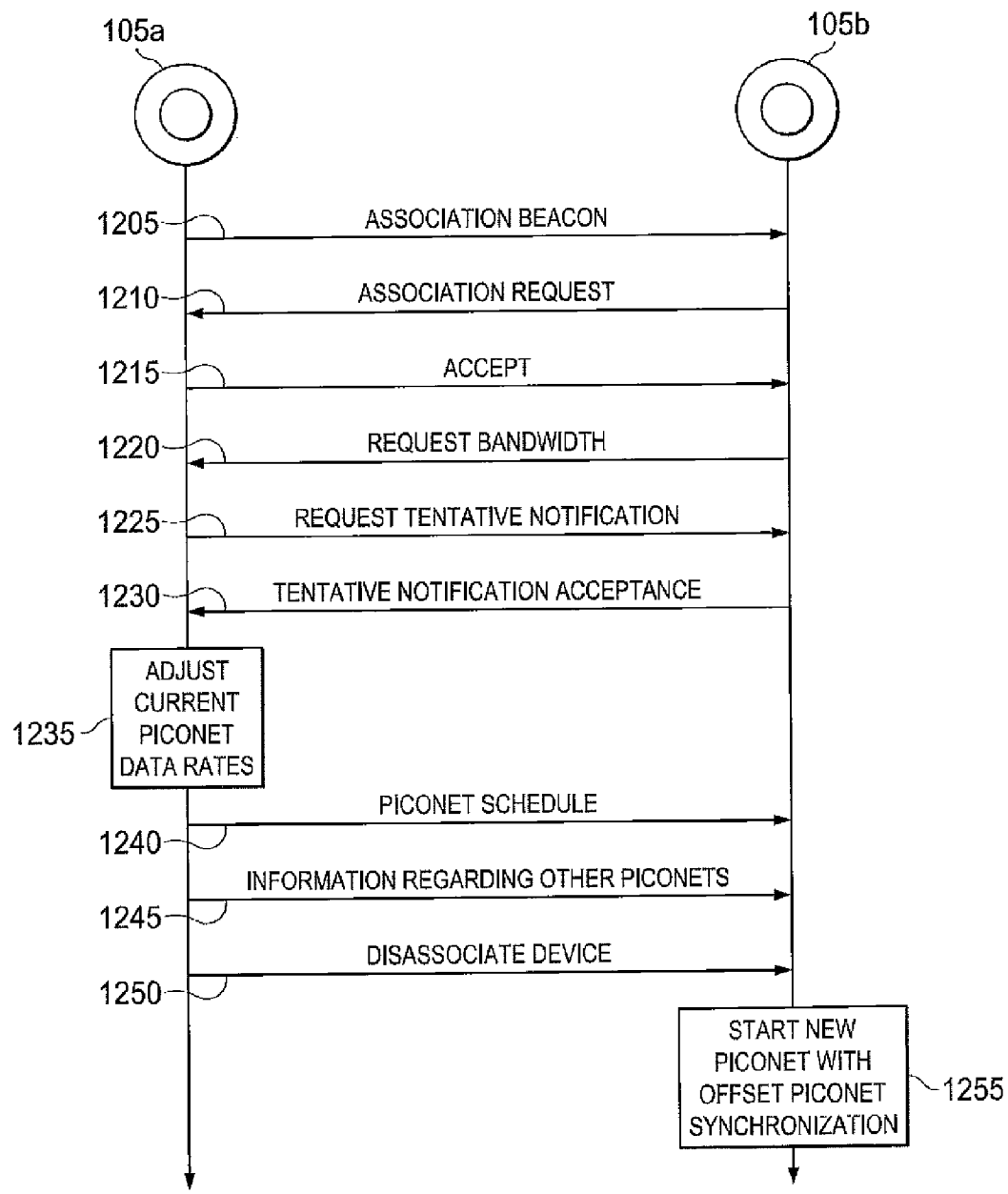
FIG. 12 illustrates a sequence of operations for an offset mode piconet synchronization according to embodiments of the present disclosure.

FIG. 12 illustrates a sequence of operations for offset mode piconet synchronization according to embodiments of the present disclosure. The embodiment of the sequence of operations shown in FIG. 12 is for illustration only. Other embodiments could be used without departing from the scope of this disclosure.

The first central device 105a transmits an Association Beacon 1205 that can be detected by the second central device 105b. For example, the second central device 105b can perform the listen-before-talk process 700 to determine if any other piconets that are in close proximity are operating on the same frequency band and at the same time.

When the second central device 105b detects the Association Beacon 1205, the second central device 105b transmits an Association Request 1210 to join the piconet 605 as a device. In response, the first central device 105a can transmit an Accept Message 1215 granting the Association Request 1210.

Thereafter, the second central device 105b can transmit a Request for Bandwidth 1220 to start the second piconet 610. The Request for Bandwidth 1220 can include priority information corresponding to the type of service to be provided on the second piconet 610. For example, the second central device 105b can include priority information indicating that the devices in the second piconet 610 will be performing medical applications.

In response to the Request for Bandwidth 1220, the first central device 105a can transmit a Request Tentative Notification with data rate adjustment (PHY duty cycle) 1225 to the second central device 105b. When the first piconet 605 and the proposed second piconet 610 (such as the new piconet to be formed by second central device 105b) each have a similar priority, the existing first piconet 605 may not be willing to allow priority to the new second piconet 610 but may be willing to co-exist by reducing its duty cycle and allowing the new second piconet 610 to start as an offset synchronized piconet. For example, if the first piconet 605 is performing an equal priority application as the second piconet 610, the first central device 105a sends the Request Tentative Notification with data rate adjustment (PHY duty cycle) 1225 to the second central device 105b. The Request Tentative Notification with data rate adjustment (PHY duty cycle) 1225 informs the second central device 105b that the first central device 105a cannot release time resources to the second central device 105b but can adjust its physical layer data rate/duty cycle to ensure that the devices in the first piconet 605 have the same duty cycle during operation. The second central device 105b can acknowledge the Request Tentative Notification with data rate adjustment (PRY duty cycle) 1225 with a Tentative Notification Acceptance Message 1230.

The first central device 105a adjusts the data rate 1235 of the first piconet 605 and sends a Piconet Schedule 1240 to the second central device 105b. The Piconet Schedule 1240 can include the timing information to be used by the second central device 105b to start the second piconet 610. Thereafter, the first central device 105a can utilize the remaining resources for the applications in the first piconet 605.

The first central device 105a also can send Information Regarding Other Piconets 1245 to the second central device 105b. The Information Regarding Other Piconets 1245 can include information regarding piconets that the second central device 105b is unable to see or otherwise unable to communicate. Piconet synchronization is done sequentially. When the second piconet 610 is being formed, the knowledge of other piconets is sent from the first central device 105a to help with logical channel selection. This information assists the second central device 105b to synchronize among multiple (>2) piconets, when such possibility exists.

The first central device 105a then Dissociates 1250 the second central device 105b from the first piconet 605. In some embodiments, the second central device 105b initiates the disassociation. The central devices 105 are dissociated from each other in order to reduce overhead between the piconets 605, 610.

Thereafter, the second central device 105b starts the second piconet 610. The second central device 105b uses the Association Beacon 1205 information of the first central device 105a to find the offset, data rates and duty cycle needed to start 1255 the second piconet 610. For example, the MAC tells the physical what offset to use (e.g., when to start). Additionally, the second central device 105b can provide for gaps to be included to allow for clock drifting and multipath.

FIGS. 13A through 13B illustrate piconet offset synchronization according to embodiments of the present disclosure. The embodiments of the piconet offset synchronization shown in FIGS. 13A-B are for illustration only. Other embodiments could be used without departing from the scope of this disclosure.

FIG. 13A shows the piconet timing for the first piconet 605 prior to duty cycle adjustment. FIG. 13B shows the piconet timing for the first piconet 605 and the second piconet 610 after duty cycle adjustment.

Figure 14:
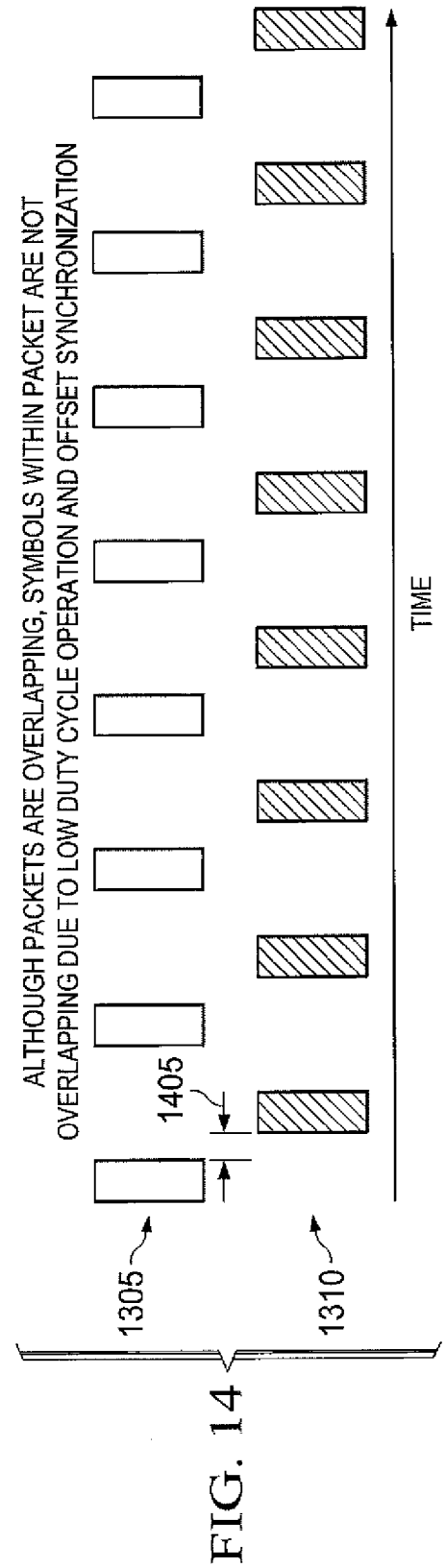
FIG. 14 illustrates a synchronization offset according to embodiments of the present disclosure.

Prior to adjusting the piconet timing, the first central device 105a operates the first piconet 605 according a first data rate/duty cycle 1300. If the first piconet 605 has an equal priority as the piconet 610, the first central device 105a can adjust the data rate/duty cycle of the first piconet 605 to a new data rate/duty cycle 1305. The second central device 105b uses the Association Beacon from the first central device and/or timing information from the first central device to determine the new data rate/duty cycle 1305. The second central device 105b determines an offset, data rate and duty cycle to use to start the second piconet 610. Accordingly, the second central device 105b starts, and operates, the second piconet 610 according to the second piconet data rate/duty cycle 1310. An example of the offset 1405 is illustrated in FIG. 14.

Figure 15:
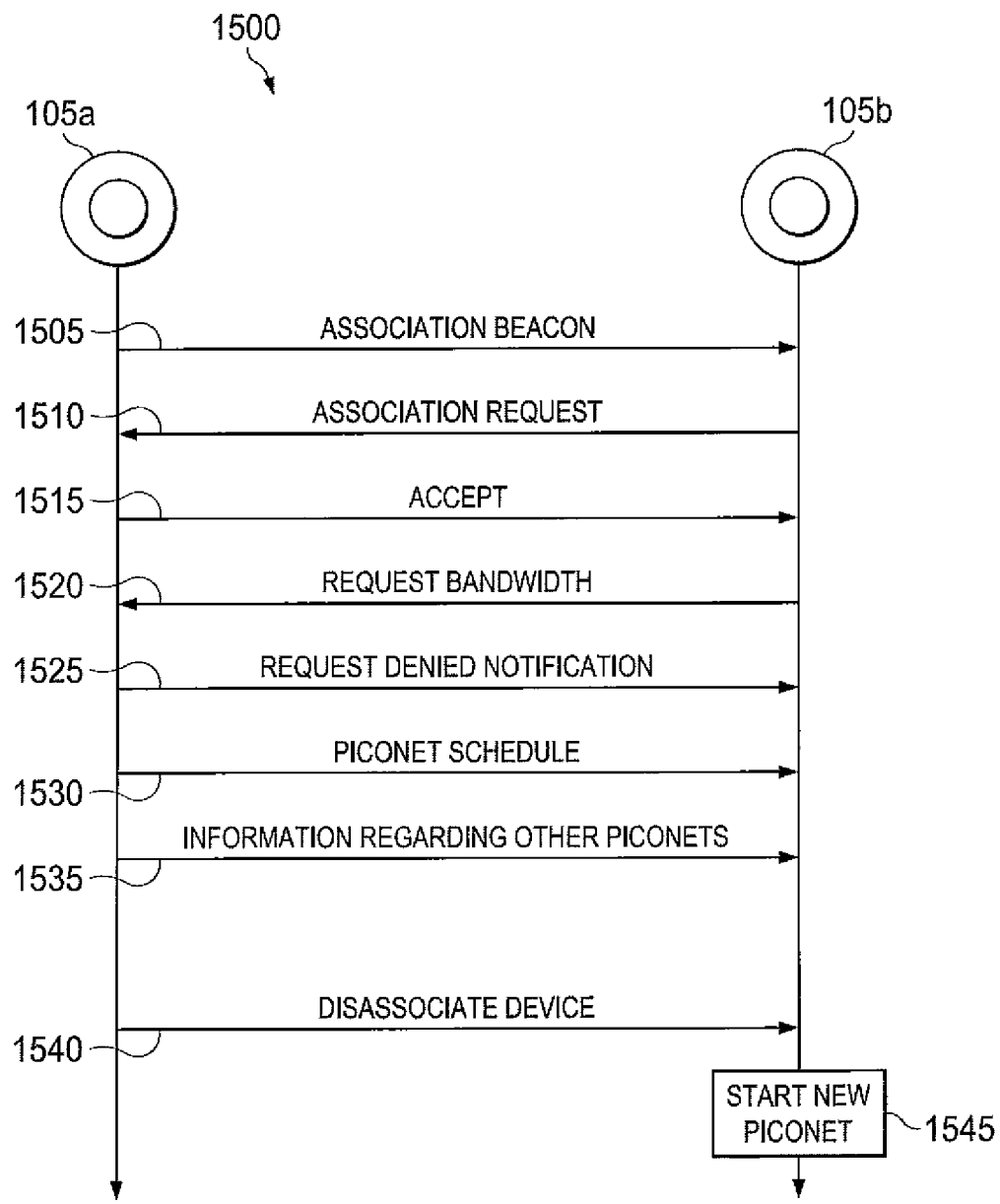
FIG. 15 illustrates a sequence of operations for coexistence interference mitigation according to embodiments of the present disclosure.

FIG. 15 illustrates a sequence of operations for coexistence interference mitigation according to embodiments of the present disclosure. The embodiment of the sequence of operations 1500 shown in FIG. 15 is for illustration only. Other embodiments could be used without departing from the scope of this disclosure.

The first central device 105a transmits an Association Beacon 1505 that can be detected by the second central device 105b. For example, the second central device 105b can perform the listen-before-talk process 700 to determine if any other piconets that are in close proximity are operating on the same frequency band and at the same time.

When the second central device 105b detects the Association Beacon 1505, the second central device 105b transmits an Association Request 1510 to join the piconet 605 as a device. In response, the first central device 105a can transmit an accept message 1515 granting the Association Request 1510.

Thereafter, the second central device 105b can transmit a Request for Bandwidth 1520 to start the second piconet 610. The Request for Bandwidth 1520 can include priority information corresponding to the type of service to be provided on the second piconet 610. For example, the second central device 105b can include priority information indicating that the devices in the second piconet 610 will be performing audio applications.

In response to the Request for Bandwidth 1520, the first central device 105a can transmit a Request Denied Notification 1525 to the second central device 105b. When the existing piconet 605 has higher priority, the first central device 105a may not be willing to make any adjustments. However, the first central device 105a can provide information about its schedule to the second central device 105b enabling the second central device 105b to decide whether it can start the second piconet 610 in the selected band in a NI mode or start in CM mode.

The first central device 105a sends a Piconet Schedule 1530 to the second central device 105b. The Piconet Schedule 1530 can include the timing information to be used by the second central device 105b to start the second piconet 610. Thereafter, the first central device 105a continues to utilize the resources for the applications in the first piconet 605.

The first central device 105a also can send Information Regarding Other Piconets 1535 to the second central device 105b. The Information Regarding Other Piconets 1535 can include information regarding piconets that the second central device 105b is unable to see or otherwise unable to communicate. Piconet synchronization is done sequentially.

When the second piconet 610 is being formed, the knowledge of other piconets is sent from the first central device 105a to help with logical channel selection. This information assists the second central device 105b to synchronize among multiple (>2) piconets, when such possibility exists.

The first central device 105a then Dissociates 1540 the second central device 105b from the first piconet 605. In some embodiments, the second central device 105b initiates the disassociation. The central devices 105 are dissociated from each other in order to reduce overhead between the piconets 605, 610.

Thereafter, the second central device 105b starts 1545 the second piconet 610. The second central device 105b uses the knowledge of the first piconet 605 to schedule the second piconet 610 or to start the second piconet in a CM mode. The second central device 105b can used the piconet schedule 1530 to determine sufficient time resources are available to operate in NI mode. If sufficient time resources are not available, the second central device can start the second piconet 610 in CM mode. This mode can also be referred to as a denied time resource mode of operation.

Figure 16:
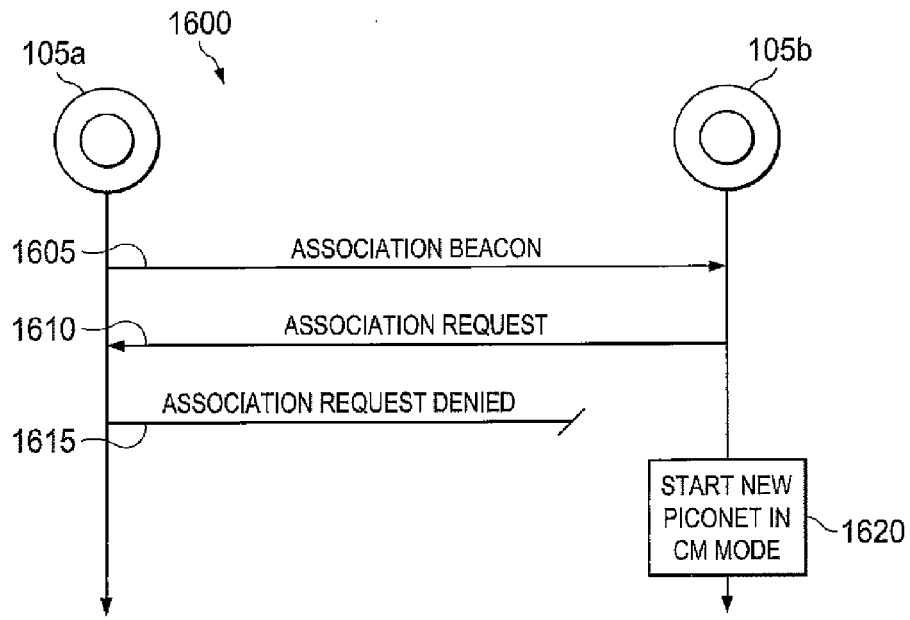
FIG. 16 illustrates another sequence of operations for coexistence interference mitigation according to embodiments of the present disclosure.

FIG. 16 illustrates another sequence of operations for coexistence interference mitigation according to embodiments of the present disclosure. The embodiment of the sequence of operations 1600 shown in FIG. 16 is for illustration only. Other embodiments could be used without departing from the scope of this disclosure.

The first central device 105a transmits an Association Beacon 1605 that can be detected by the second central device 105b. For example, the second central device 105b can perform the listen-before-talk process 700 (discussed herein above with respect to FIG. 7) to determine if any other piconets that are in close proximity are operating on the same frequency band and at the same time.

When the second central device 105b detects the Association Beacon 1605, the second central device 105b transmits an Association Request 1610 to join the piconet 605 as a device. However, when the first piconet 605 has a higher priority and is performing some critical applications, the first central device 105a may refuse to associate any new devices 114-114 or new piconet controllers (that is, central devices 105). Therefore, in response, the first central device 105a transmits an Association Denied message 1615 denying the Association Request 1610. Accordingly, the first central device 105a and the second central device 105b do not communicate any further with each other. Thereafter, the second central device 105b starts 1620 the second piconet 610 in a CM mode.

In some embodiments, the piconets 605, 610 can share the resources based on a guaranteed reservation mode for resource allocation. Using the guaranteed reservation mode, each piconet 605, 610 is provided a guaranteed portion of the resource reservation up to a certain percentage of the bandwidth. The piconet controllers (that is, the central devices 105) can reserve excess resources for their applications, based on an estimate. The reserved excess is released, however, for sharing with other piconets having a higher or equal priority.

For example, when at least ten (10) piconets are operating within the 6×6×6 m$^3$ area, an allocation of 10% of the total bandwidth or 20% of the time resources for each frequency band 405, 410 within the two frequency bands (discussed herein above with respect to FIG. 4) can be guaranteed for each of the piconets. Further, resource management (such as the logical channel selection to use the guaranteed portion of the resources) can be performed during formation and termination of the piconet. In some embodiments, the central device 105 also can re-initiate logical channel selection during operation, such as during a free period, in order to provide better coexistence.

Furthermore, as stated herein above, the Association Beacons are used for association with other central devices 105, such as when the second central device 105b associates as a device in the first piconet 605 operated by the first central device 105a. However, in some embodiments, regular messages (beacons) are utilized for association. The regular messages are broadcast at specified intervals in order to facilitate association. Additionally, as illustrated herein above, after the central devices 105 have exchanged information, the central devices 105 dissociate from each other in order to reduce overhead between the piconets.

Figure 17:
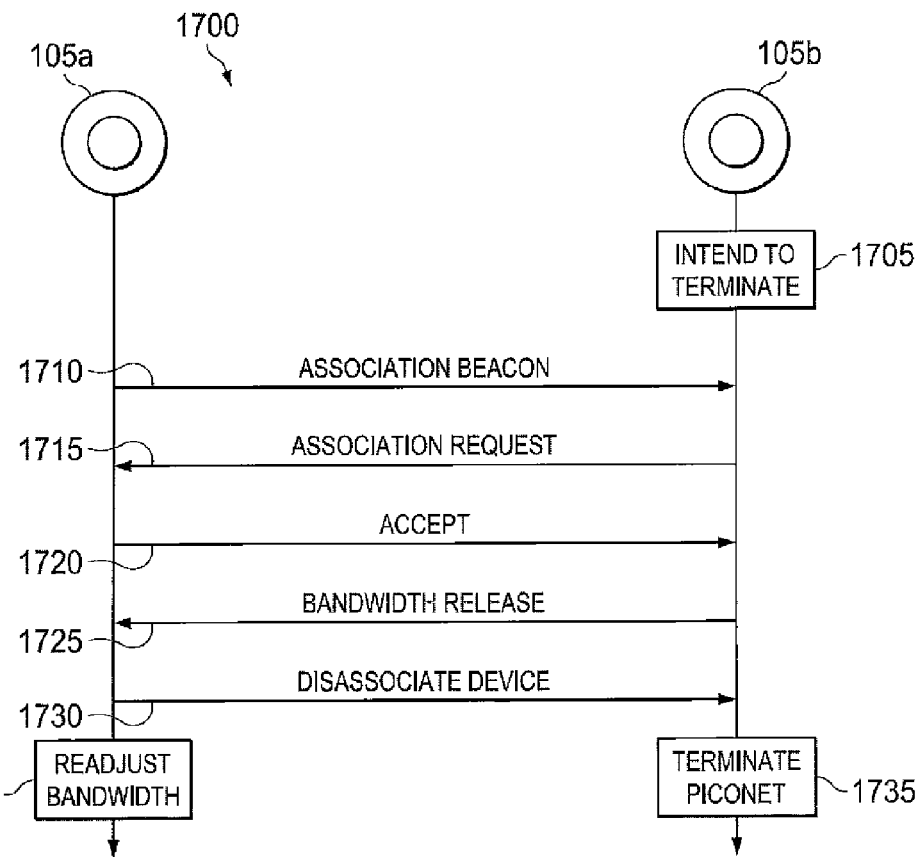
FIG. 17 illustrates a termination sequence of operations according to embodiments of the present disclosure.

FIG. 17 illustrates a termination sequence of operations according to embodiments of the present disclosure. The embodiment of the sequence of operations 1700 shown in FIG. 17 is for illustration only. Other embodiments could be used without departing from the scope of this disclosure.

In some embodiments, a first piconet controller can inform a neighboring piconet controller that the first piconet is terminating in order to allow the neighboring piconet to adjust its bandwidth. For example, the first central device 105a can inform the second central device 105b regarding the intent by the first central device 105a to terminate operations in the first piconet 605. The first central device 105a can inform the second central device 105b prior to termination of operations in the piconet 605. Thereafter, the second central device 105b can readjust the bandwidth to use the additional bandwidth for the second piconet 610 applications. Therefore, if "n" piconets exist, an $$\frac{n}{n-1}$$

times improvement in bandwidth can be achieved.

A decision to cease piconet operation 1705 is made for the second piconet 610. For example, a user may have decided to turn off applications running on the piconet 610 by shutting down, or otherwise commanding the second central device 105b to cease piconet operations.

The first central device 105a transmits an Association Beacon 1710 that can be detected by the second central device 105b. For example, the second central device 105b may have performed, during piconet formation, the listen-before-talk process 700 to determine if any other piconets that were in close proximity and were operating on the same frequency band and at the same time. Thereafter, the second central device 105b continued to be aware of the presence of the first piconet 605. For example, the second central device 105b can store information regarding the presence of the first piconet 605 and/or first central device 105a in memory 220.

When the second central device 105b detects the Association Beacon 1710, the second central device 105b transmits an Association Request 1715 to join the piconet 605 as a device. In response, the first central device 105a can transmit an Accept Message 1720 granting the Association Request 1715. Thereafter, the second central device 105b transmits a Bandwidth Release Message 1725 informing the first central device 105a regarding a bandwidth release resulting from the cessation of operation for the second piconet 610. The first central device 105a then Dissociates 1730 the second central device 105b from the first piconet 605. Thereafter, the second central device 105b terminates 1735 the second piconet 610. Additionally, the first central device 105a can readjust the bandwidth 1740 used by the first piconet 605 as appropriate.

Occasionally, the first central device 105a and the second central device 105b are unable to communicate directly with each other. For example, the central devices 105 could be located beyond each central device's 105 communication range or an obstruction of some sort could exist between the central devices 105. Therefore, in some embodiments, the central devices 105 can uses a device relay scheme for communicating with each other.

Figure 18:
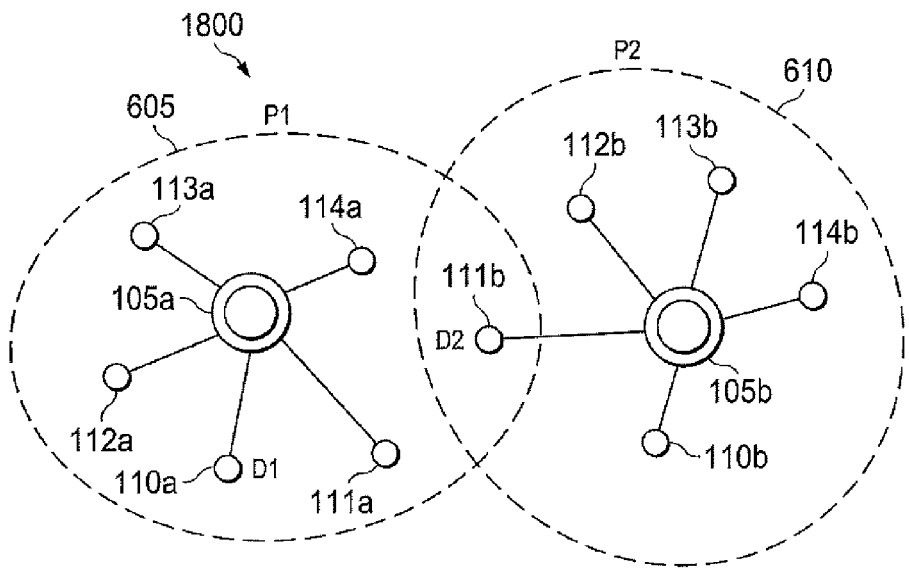
FIG. 18 illustrates two piconets utilizing a device relay scheme according to embodiments of the present disclosure.

FIG. 18 illustrates two piconets utilizing a device relay scheme according to embodiments of the present disclosure. The embodiment of the device relay scheme 1800 shown in FIG. 18 is for illustration only. Other embodiments could be used without departing from the scope of this disclosure.

The first piconet 605 and the second piconet 610 are operating in close proximity to each other. For example, both piconets 605, 610 can be operating within a 6×6×6 m³ area. Additionally, the piconets 605, 610 may have just come into proximity with each other. For example, the second piconet 610 may have been brought into proximity to the first piconet 605. In an additional example, the second piconet 610 is activated, or formed, while in close proximity to the first piconet 605.

The first piconet 605 includes, as a piconet controller, the first central device 105a. The first piconet 605 also includes a number of devices, such as device D1 110a, associated with the first central device 105a.

The second piconet 610 includes, as a piconet controller, the second central device 105b. The second piconet 610 also includes a number of devices, such as device D2 111b, associated with the second central device 105b.

D2 111b also is located such that it is within a coverage area of the first piconet 605. As such, D2 111b can see activity in the first piconet 605, such as by hearing communications from the first central device 105a although D2 111b is not associated with the first central device 102b. D2 111b can monitor the activities in the first piconet 605 and report the monitored activities to the second central device 105b.

Figure 19:
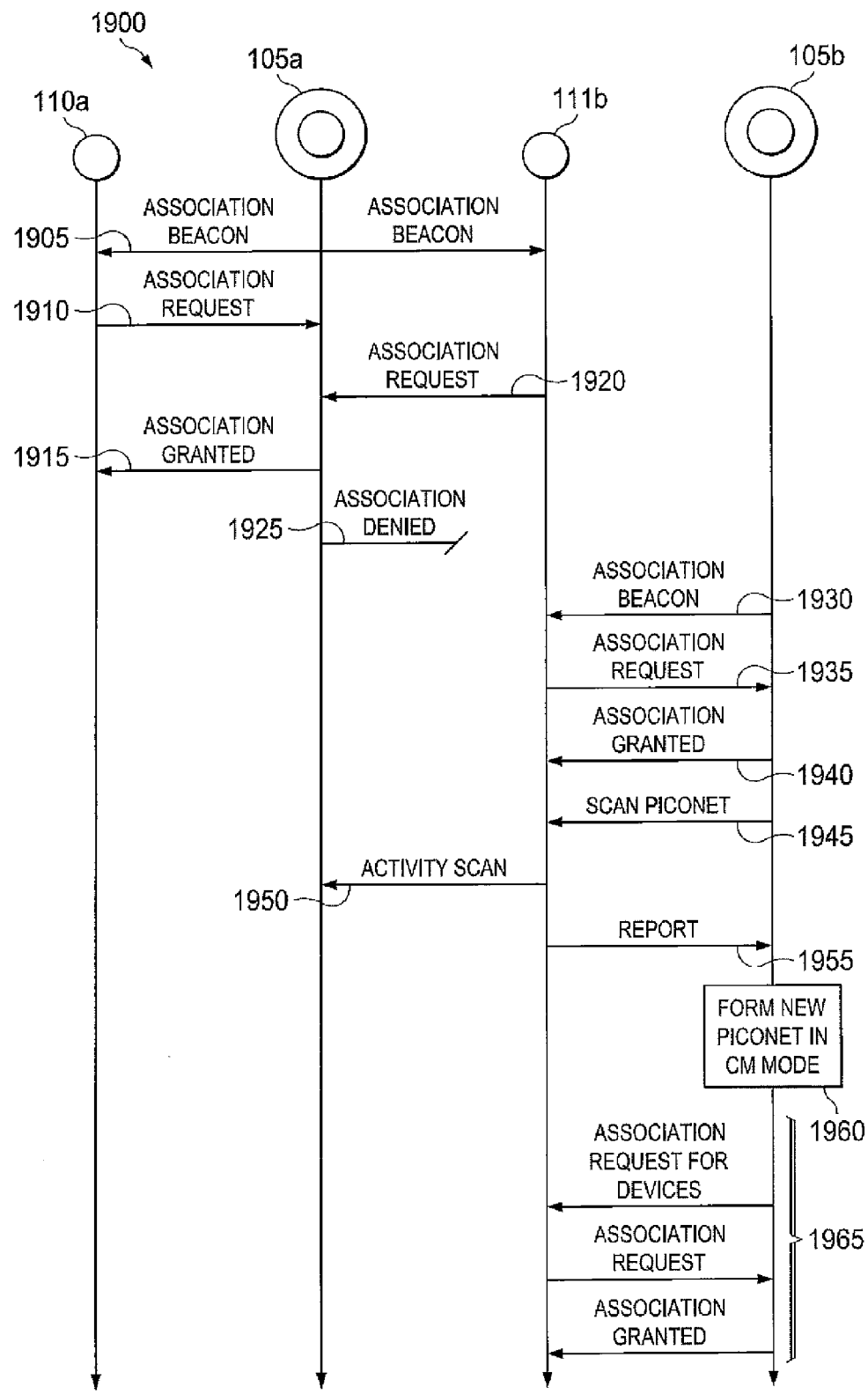
FIG. 19 illustrates an extended relay communication sequence of operations according to embodiments of the present disclosure.

FIG. 19 illustrates an extended relay communication sequence of operations according to embodiments of the present disclosure. The embodiment of the sequence of operations 1900 shown in FIG. 19 is for illustration only. Other embodiments could be used without departing from the scope of this disclosure.

The second central device 105b can monitor activities within the first piconet 605 using an extended relay mode. Each central device 105 knows which devices are meant to associate with it using higher layer protocols. For example, the first central device 105a can associate with D1 110a but not with D2 111b. The second central device 105b associates with D2 111b. However, D2 111b can act as a "listen-only" relay for the second central device 105b. D2 111b can relay to the second central device 105b information about the existence and activities of the first piconet 605. Therefore, even though the second central device 105b may not be able to talk to the first central device 105a, the second central device 105b can receive information regarding activities in the first piconet 605 in order to better operate in a CM mode.

The first central device 105a transmits an Association Beacon 1905 that can be detected by D1 110a and D2 111b. D1 110a transmits an Association Request 1910 to join the first piconet 605 as a device. The first central device 105a determines, using higher layer protocols, that D1 110a is a device to which the first central device 105a can associate. Therefore, the first central device 105a transmits an Association Granted message 1915 granting the Association Request 1910 from D1 110a.

Additionally, D2 111b transmits an Association Request 1920 to join the first piconet 605 as a device. The first central device 105a also determines, using higher layer protocols, that D2 111b is a device to which the first central device 105a cannot associate. Therefore, the first central device 105a transmits an Association Denied message 1925 denying the Association Request 1920 from D2 111b. Although D2 111b is not associated with the first central device 105a, D2 111b still is able to hear communications from the first central device 105a.

The second central device 105b also transmits an Association Beacon 1930. In response, D2 111b transmits an Association Request 1935 to join the second piconet 610 as a device. The second central device 105b determines, using higher layer protocols, that D2 111b is a device to which the second central device 105b can associate. Therefore, the second central device 105b transmits an Association Granted message 1940 granting the Association Request 1935 from D2 111b.

Thereafter, the second central device 105b transmits a Scan Piconet Request 1945 to D2 111b. The Scan Piconet Request 1945 can be a message sent only to D2 111b or a unicast message sent to all devices 110b-114b in the second piconet 610. The scan piconet request 1945 instructs one or more of the devices 110b-114b, such as D2 111b, to scan activity occurring in an adjacent piconet, such as the first piconet 605.

In response, D2 111b performs an Activity Scan 1950 on the first piconet 605. In the Activity Scan 1950, D2 111b listens to communications from the first central device 105a. D2 111b then sends a Report 1955 to the second central device 105b regarding the observed activity in the first piconet 605. For example, D2 111b acts as a "listen-only" relay for the second central device 105b and relays information about the existence of the first piconet. Therefore, the second central device 105b receives limited visibility to first central device 105a. Although the second central device 105b cannot talk to first central device 105a, the second central device 105b can learn about the first central device's 105b activity for operation in CM mode.

Thereafter, the second central device 105b starts 1960 the second piconet 610 in a CM mode. The second central device 105b uses the information received in the Report 1955 for operation of the second piconet 610 in the CM mode. The second central device 105b then associates devices via Association Messaging 1965.

Although FIGS. 9, 12, 15-17 and 20-21 illustrate example sequence of operations for piconet communications, various changes may be made to FIGS. 9, 21, 15-17 and 20-21. For example, while these figures illustrate example messages or signals at different times, one or more messages could be omitted, modified or rearranged and additional steps or messages could be added in one or more of FIGS. 9, 21, 15-17 and 20-21.

Figure 20:
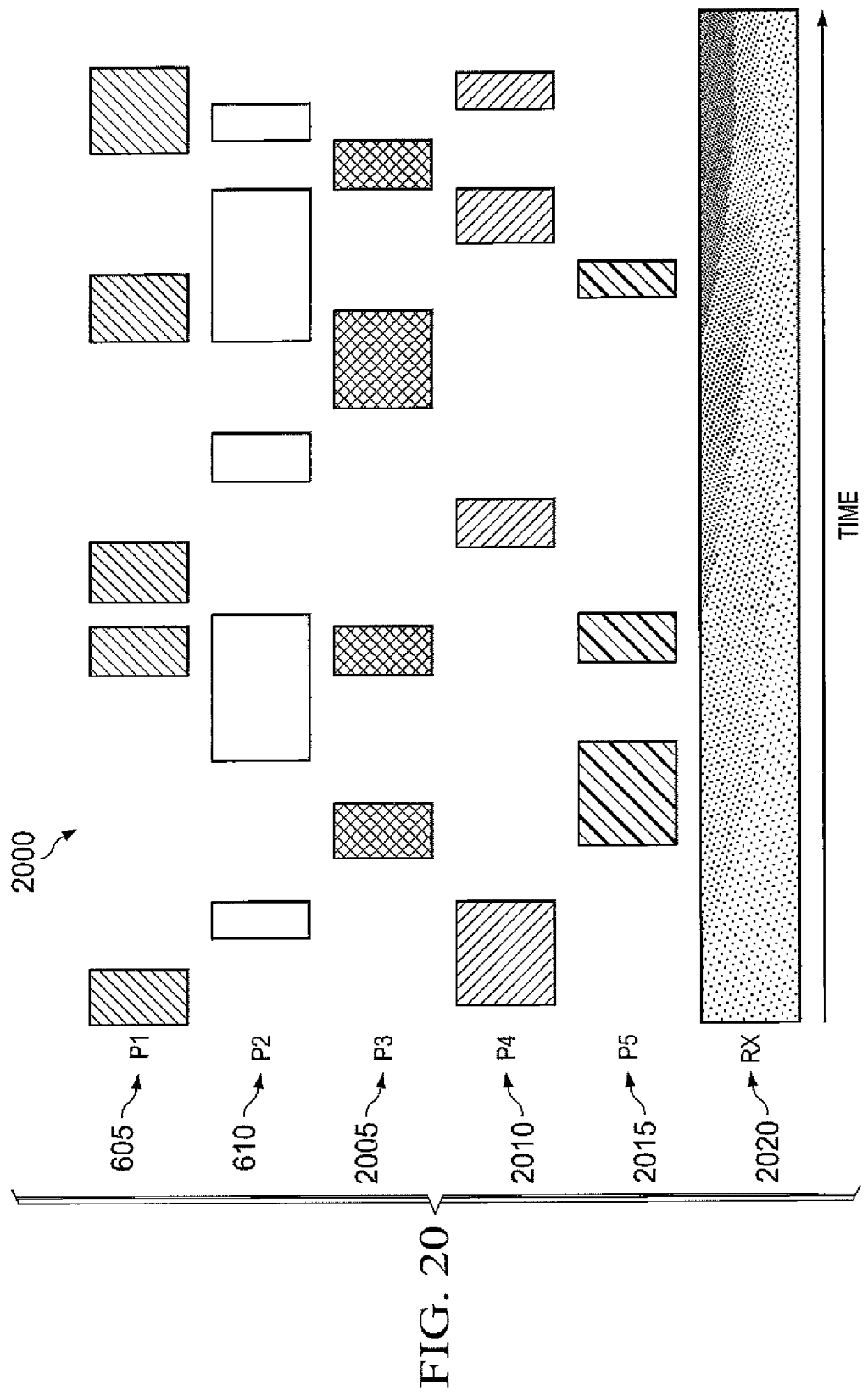
FIG. 20 illustrates a coexistence interference mitigation timing for unsynchronized piconets.

FIG. 20 illustrates coexistence interference mitigation timing for unsynchronized piconets. The embodiment of the coexistence interference mitigation 2000 shown in FIG. 20 is for illustration only. Other embodiments could be used without departing from the scope of this disclosure.

In some embodiments, unsynchronized piconets use, a coexistence interference mitigation scheme when the piconets are unable or unwilling to talk with each other. When the first piconet 605 and second piconet 610 are unable or unwilling to talk to each other, the second piconet 610 may start in an unsynchronized manner. As illustrated in FIG. 20, each of the piconets, P1 605, P2 610, P3 2005, P4 2010 and P5 2015 operate without synchronization to the other piconets. Therefore, a receiver 2020 in one piconet, such as the second piconet 610, that is operating within proximity to the other piconets can receive transmissions from the second piconet as well as transmissions, some of which may be overlapping, from the other piconets. Therefore, in some embodiments, a logical assignment of the new piconet, such as the second piconet 610, is managed intelligently in order to minimize the impact on the existing piconets.

Figure 21:
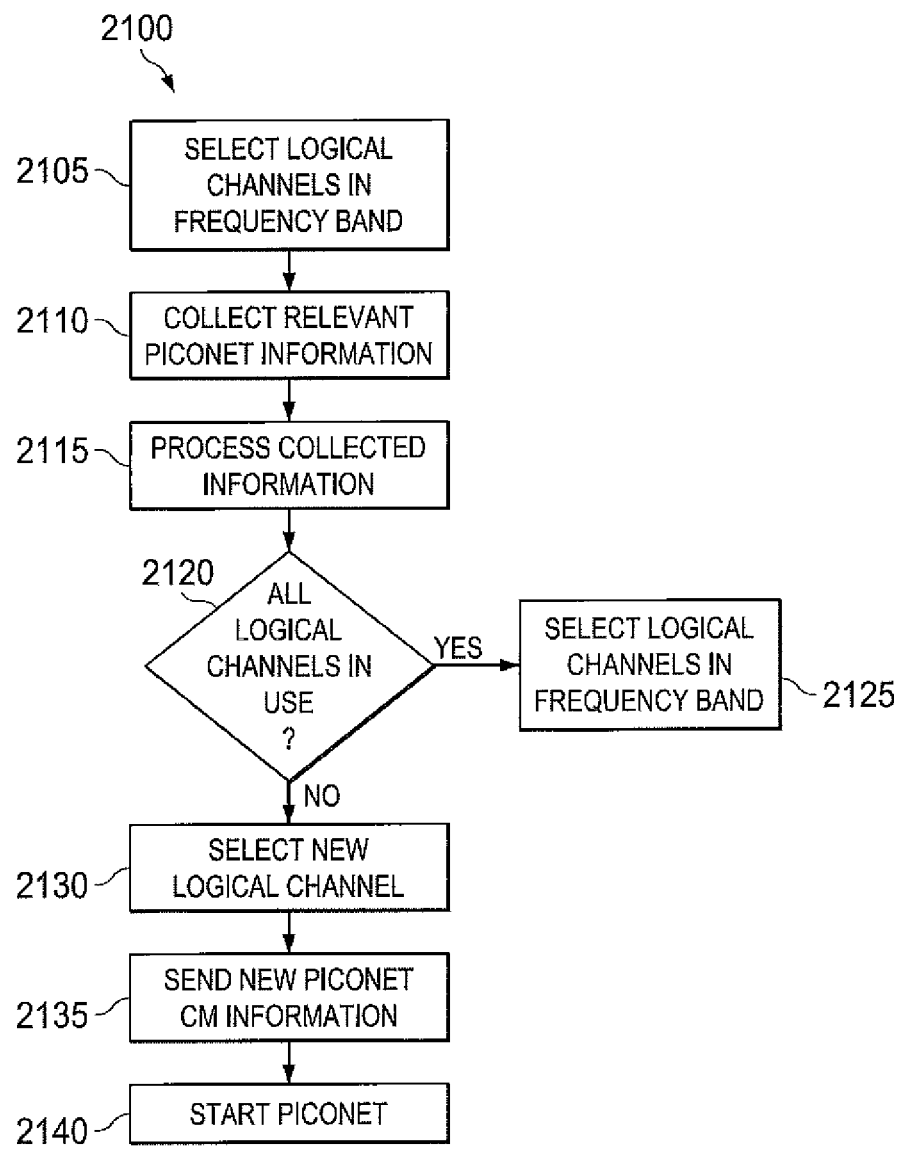
FIG. 21 illustrates a process for logical channel selection according to embodiments of the present disclosure.

FIG. 21 illustrates a process for logical channel selection according to embodiments of the present disclosure. The embodiment of the process 2100 shown in FIG. 21 is for illustration only. Other embodiments could be used without departing from the scope of this disclosure.

When the second piconet 610 is to be formed in an unsynchronized manner, the second central device 105*b* scans the logical channels in the frequency bands. For example, the second central device 105*b* scans all the logical channels in all the frequency bands in block 2105. The second central device 105*b* scans the logical channels in order to determine if one or more piconets are operating in close proximity.

When one or more piconets are found, the second central device 105*b* collects piconet information in block 2110. For example, the second central device 105*b* collects relevant piconet information, such as number of devices, received signal strength indication (RSSI), and the like, from the first central device 105*a*. The information can be collected through direct communications between the first central device 105*a* and second central device 105*b*, such as listening to messages (such as beacons) and decoding, or by the second central device 105*b* joining the first piconet 605 as a device. Additionally, the relevant piconet information can be collected through an extended relay mode communication. The second central device 105*b* gathers the relevant piconet information to obtain a traffic estimate and to figure out how far the devices on the first piconet 605 are from the second central device 105*b*.

In some embodiments, the relevant piconet information includes a number of devices in an existing piconet. For example, the relevant information indicates that the first piconet 605 includes five (5) devices 110*a*-114*a*. The second central device 105*b* can use this data to determine the probability of interference seen and the amount of bandwidth available in the first piconet 605. If the first piconet 605 includes a significant number of devices, the second central device 105*b* determines that the probability of interference is high. Also, if the second central device 105*b* later determines that no new piconet is available (see block 2125 herein below), the second central device 105*b* uses this information to merge into the first piconet 605 and still support applications with other devices.

In some embodiments, the relevant piconet information includes RSSI information. The second central device 105*b* uses the RSSI to calculate the distances from the second central device 105*b* to the devices in the first piconet 605. The second central device 105*b* also estimates the expected signal to interference-plus-noise ratio (SINR) at the receiver. Accordingly, the second central device 105*b* can calculate the amount of interference seen and the data rates that the second piconet 610 will be able to support.

In some embodiments, the relevant piconet information includes existing data rates used by devices in the first piconet 605. The second central device 105*b* uses the existing data rates to calculate the amount of interference from the second piconet 610 that the first piconet 605 will be able to tolerate.

In some embodiments, the relevant piconet information includes priority information about medical or quality of service (QoS) sensitive devices in the first piconet 605. The second central device 105*b* uses the priority and/or QoS information to help manage coexistence to give priority to the first piconet 605 that supports such devices.

The second central device 105*b* processes the collected information in block 2115. The second central device 105*b* processes the collected information to make a determination about a new logical channel and frequency band. For example, the second central device 105*b* can determine if all logical channels are in use in block 2120.

If all the logical channels are in use, the second central device determines, in block 2125, that no new logical channel is available. The second central device 105*b* then can decide to join an existing piconet, such as the first piconet 605, or return to block 2105 and repeat the process until a new logical channel becomes available.

If the second central device 105*b* determines that a new logical channel is available in block 2120, the second central device 105*b* selects the new logical channel in block 2130. Further, the second central device 105*b* can be configured to select a channel from group of available new logical channels identified in block 2120.

In block 2135, the second central device 105*b* sends new piconet CM information to the existing piconets in the frequency band that includes the selected new logical channel. The second central device 105*b* can send the piconet CM information via a notification scheme, described in further detail herein below with respect to FIG. 22. Thereafter, the second central device 105*b* starts the second piconet 610 using the new logical channel in block 2140.

Figure 22:
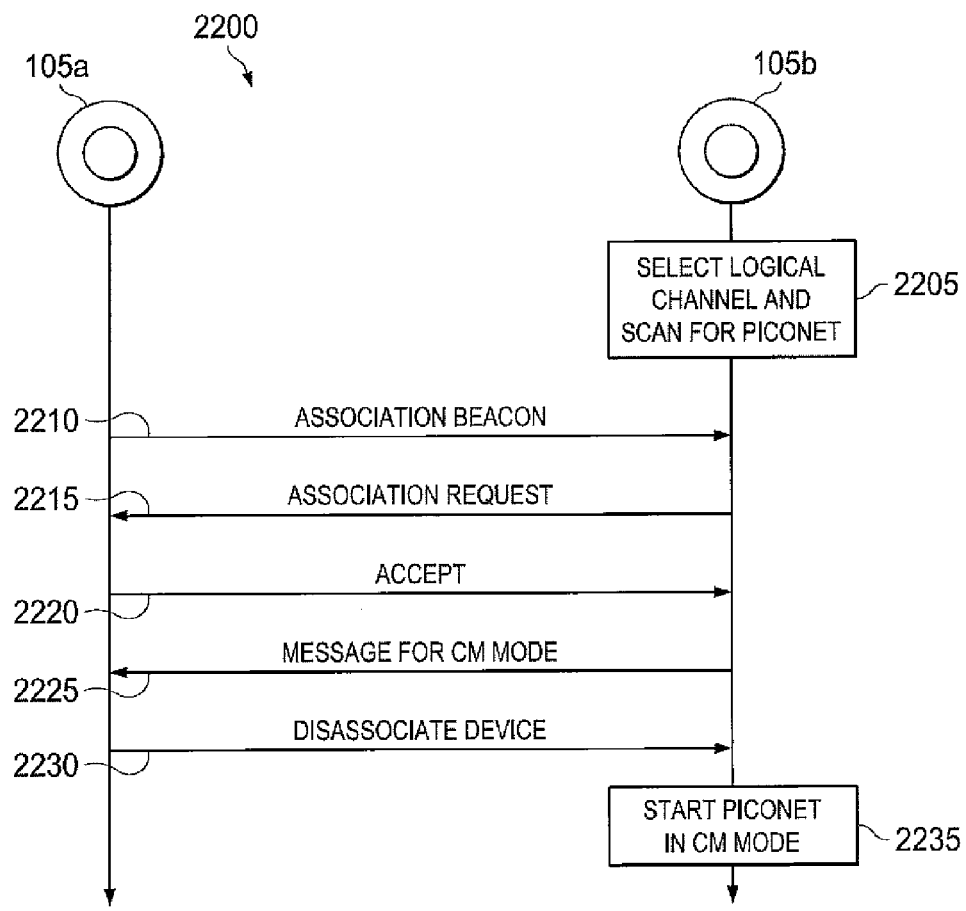
FIG. 22 illustrates a sequence for CM piconet notification according to embodiments of the present disclosure.

FIG. 22 illustrates a sequence for CM piconet notification according to embodiments of the present disclosure. The embodiment of the sequence 2200 shown in FIG. 22 is for illustration only. Other embodiments could be used without departing from the scope of this disclosure.

In some embodiments, a notification scheme is used when a piconet controller decides to form a new piconet in the CM mode. Once the piconet controller decides to establish a new piconet, the piconet controller can send the intention to start a new piconet in the CM mode to one or more existing piconet controllers in the frequency band. The piconet controller sends the intention to start a new piconet in the CM mode to the existing piconet controllers to which the piconet controller can talk. The notification scheme can be used to help existing piconet controllers to become aware of the new piconet and assists the piconets to make better decisions for coexistence.

For example, when the second central device 105*b* decides to establish the second piconet 610, the second central device 105*b* sends the intention to start a new piconet in the CM mode to the first central device 105*b*. The second central device 105*b* selects a new logical channel in a CM mode and scans for existing piconets in block 2205. The second central device 105*b* detects an Association Beacon 2210 from the first central device 105*a*. For example, the second central device 105*b* may have performed, during piconet formation, the listen-before-talk process 700 to determine if any other piconets that were in close proximity and were operating on the same frequency band and at the same time.

When the second central device 105*b* detects the Association Beacon 2210, the second central device 105*b* transmits an Association Request 2215 to join the piconet 605 as a device. In response, the first central device 105*a* can transmit an accept message 2220 granting the Association Request 2215. Thereafter, the second central device 105*b* transmits a Message 2225 informing the first central device 105a that the second piconet 610 is being formed in CM mode. The first central device 105a then Disassociates 2230 the second central device 105b from the first piconet 605. Thereafter, the second central device 105b starts 2235 the second piconet 610 in CM mode.

Although FIG. 22 illustrates an example sequence of operations for piconet communications, various changes may be made to FIG. 22. For example, while this figure illustrate example messages or signals at different times, one or more messages could be omitted, modified or rearranged and additional steps or messages could be added in FIG. 22.

Although this disclosure has used UWB as a particular technology example, this disclosure is equally applicable to other wireless technologies as well.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A device for use in a body area network capable of low power communications, the device comprising:
   a controller configured to form a first piconet capable of coexisting with a second piconet, the controller further configured to couple to at least one secondary device, the device and a secondary device coupled in the first piconet; and
   a transmitter configured to communicate with the secondary device via a wireless communication channel, wherein the controller is configured to receive, from the second piconet, information regarding a third piconet that the first piconet controller is unable to detect, and to select communication channel resources based at least in part on resources allocated to the second piconet and the information regarding the third piconet, and wherein the controller is configured to form the first piconet to operate in at least one of:
      a non-interference mode when the controller is able to establish communications with a second controller in the second piconet, and
      an interference mitigation mode when the controller is unable to establish communications with the second controller in the second piconet.

2. The device as set forth in claim 1, wherein the wireless communication channel is an ultra-wide band communication.

3. The device as set forth in claim 1, wherein, when operating in the non-interference mode, the controller is configured to at least one of:
   negotiate with a second controller in the second piconet for communication channel time resources, and
   use an offset synchronization method.

4. The device as set forth in claim 3, wherein the controller is configured to operate in a time resource sharing mode such that the second controller in the second piconet adjusts a timing for the second piconet to share time resources with the first piconet.

5. The device as set forth in claim 3, wherein the controller is configured to use a message from the second controller in the second piconet to determine an offset to start the first piconet and at least one of data rates and duty cycles that can be used by the first piconet, and wherein the second controller is configured to limit a data rate for all devices in the second piconet to a certain duty cycle to allow an offset start for the first piconet.

6. The device as set forth in claim 5, wherein the controller is configured to determine the offset such that a gap is allowed for at least one of clock drifting and multipath communications.

7. The device as set forth in claim 1, wherein when controller is configured to use at least one of priority and quality of service sensitivity information received from a second controller in the second piconet to start the first piconet in the coexistence interference mitigation mode.

8. The device as set forth in claim 1, wherein the controller is configured to inform the second piconet controller regarding an intention to start the first piconet in the coexistence interference mitigation mode.

9. The device as set forth in claim 1, wherein the controller is configured to join the second piconet as an associated secondary device.

10. The device as set forth in claim 1, wherein one of the at least one secondary device is disposed in a coverage area of both the first piconet and the second piconet and wherein controller is configured to use one of the at least one secondary device to monitor activities in the second piconet.

11. The device as set forth in claim 1, wherein the controller is configured to receive information regarding additional piconets from the second piconet.

12. The device as set forth in claim 1, wherein the controller is configured to inform the second piconet controller regarding an intention to release a bandwidth used by the first piconet.

13. The device as set forth in claim 1, wherein the controller is configured to form the first piconet in the coexistence interference mitigation mode when the controller receives a denial message from the second controller in the second piconet.

14. The device as set forth in claim 13, wherein, in response to receiving a request denied message from the second controller, the controller is configured to search additional logical channels for a best channel to launch.

15. The device as set forth in claim 1, wherein the controller is configured to inform a second controller in the second piconet regarding a decision to terminate the first piconet.

16. For use in a body area network capable of low power wireless communications, a coexistence method for operating a piconet, the coexistence method comprising:
   selecting, by a first piconet controller, a first frequency band as an operation frequency band for operation of a first piconet;
   scanning at least one channel in the operation frequency band to determine if a second piconet is operating within the at least one channel;
   receiving, from the second piconet, information regarding a third piconet that the first piconet controller is unable to detect; and
   forming the first piconet based at least in part on a result of the scanning and the information regarding the third piconet, wherein the first piconet is formed in:
      a random mode if the second piconet is not determined to be operating within the at least one channel, and
      a coexistence mode if the second piconet is determined to be operating within the at least one channel.

17. The coexistence method as set forth in claim 16, wherein the coexistence mode comprises at least one of:
   a non-interference mode when the controller is able to establish communications with a second controller in the second piconet, and
   an interference mitigation mode when the controller is unable to establish communications with the second controller in the second piconet.

18. The coexistence method as set forth in claim 17, the non-interference mode comprising at least one of:
negotiating with the second controller in the second piconet for communication channel time resources, and
using an offset synchronization method.

19. The coexistence method as set forth in claim 18, wherein negotiating further comprises establishing a time resource sharing such that the second controller in the second piconet adjusts a timing for the second piconet to share time resources with the first piconet.

20. The coexistence method as set forth in claim 17, wherein using the offset synchronization method further comprises:
receiving a message from the second controller in the second piconet, and
determining, based on the received message, an offset to start the first piconet and at least one of data rates and duty cycles that can be used by the first piconet, and wherein the second controller limits a data rate for all devices in the second piconet to a certain duty cycle to allow an offset start for the first piconet.

21. The coexistence method as set forth in claim 20, wherein determining the offset comprises allowing a gap for at least one of clock drifting and multipath.

22. The coexistence method as set forth in claim 16, further comprising, in response to receiving a request denied message from the second controller, selecting a second frequency band as the operation frequency band for operation of the first piconet.

23. The coexistence method as set forth in claim 22, wherein selecting a second frequency band further comprises searching additional logical channels for a best channel.

24. The coexistence method as set forth in claim 16, further comprising collecting piconet information regarding the third piconet operating in close proximity to the first piconet.

25. The coexistence method as set forth in claim 24, wherein collecting further comprises at least one of:
joining the first piconet controller to the at least one adjacent piconet; and
receiving the piconet information via a secondary device coupled to the first piconet controller, the secondary device disposed in a coverage area of both the first piconet and the at least one adjacent piconet.

26. The coexistence method as set forth in claim 16, further comprising sending, by the first piconet controller, a termination message to a second piconet controller, wherein the termination message comprises information indicating a decision by the first piconet controller to terminate the first piconet.

27. A system that includes a plurality of devices capable of low power wireless communications, wherein a first piconet controller is configured to control communications in an existing, first piconet, the system comprising:
a second piconet controller configured to establish a new, second piconet and control communications in the second piconet to coexist with the first piconet, wherein the second piconet controller comprises:
a processor configured to form the second piconet and select a logical channel for operation of the second piconet; and
a receiver interface configured to detect a presence of the first piconet, wherein the processor is configured to receive, from the second piconet, information regarding a third piconet, which the first piconet controller is unable to detect, and the processor further is configured to select the logical channel and an operational mode based at least in part on an attribute of the first piconet and the information regarding the third piconet, and wherein the processor is configured to form the second piconet to operate in at least one of:
a non-interference mode when the processor is able to establish communications with the first piconet controller, and
an interference mitigation mode when the processor is unable to establish communications with the first piconet controller.

* * * * *